United States Patent [19]
Ross

[11] Patent Number: 5,166,977
[45] Date of Patent: Nov. 24, 1992

[54] PROTOCOL CONVERTER FOR A SECURE FAX TRANSMISSION SYSTEM

[75] Inventor: Jay B. Ross, Pennington, N.J.

[73] Assignee: Encrypto, Inc., Dallas, Tex.

[21] Appl. No.: 708,918

[22] Filed: May 31, 1991

[51] Int. Cl.⁵ ............ H04K 1/00; H04N 7/167; H04M 11/00
[52] U.S. Cl. ........................... 380/18; 379/100
[58] Field of Search .................. 380/18; 379/89, 100

[56] References Cited

U.S. PATENT DOCUMENTS

| | | | |
|---|---|---|---|
| 4,091,423 | 5/1978 | Branscome | 380/18 |
| 4,371,752 | 2/1983 | Matthews et al. | 379/89 |
| 4,392,021 | 7/1983 | Slate | 380/18 |
| 4,454,575 | 6/1984 | Bushaw et al. | 364/200 |
| 4,985,919 | 1/1991 | Naruse et al. | 380/18 |
| 4,989,244 | 1/1991 | Naruse et al. | 380/18 |
| 5,008,926 | 4/1991 | Misholi | 379/100 |

OTHER PUBLICATIONS

Faxx Master Users Manual, Telem International, Inc., Jan. 1990.

*Primary Examiner*—Salvatore Cangialosi
*Attorney, Agent, or Firm*—Gregory M. Howison

[57] ABSTRACT

A secure facsimile interface includes a main CPU (30) having associated therewith a bulk memory (32) for storing transfer data between a Group 3 facsimile machine (20) and a secure encryptor/decryptor telephone unit (10) that operates in accordance with MIL-STD-188-161. The main CPU (30) interfaces with the Group 3 machine (20) through an RJ11 port. A TELCO simulator (42) generates the telephone signals necessary to communicate with the Group 3 machine (20) and a FAX interface (36) is operable to interface between the audio and digital domain, and with the main CPU (30). An RS232 interface is connected to the encryptor/decryptor telephone unit (10) with a bit stream processor (40) operable to interface with the protocol thereof. A forward error correction processor (38) is provided for interfacing between the bit stream processor (40) and the main CPU (30) and selectively providing forward error correction detection of incoming data and encoding error correction information on outgoing data on a substantially real time basis. Data is received from the encryptor/decryptor telephone unit (10) on a page basis and stored in the memory (32) for later transfer to the Group 3 machine (20). In the opposite direction, data is received from the Group 3 machine (20) and stored on a page basis in the memory (32) for later transfer to the secure encryptor/decryptor telephone unit.

24 Claims, 12 Drawing Sheets

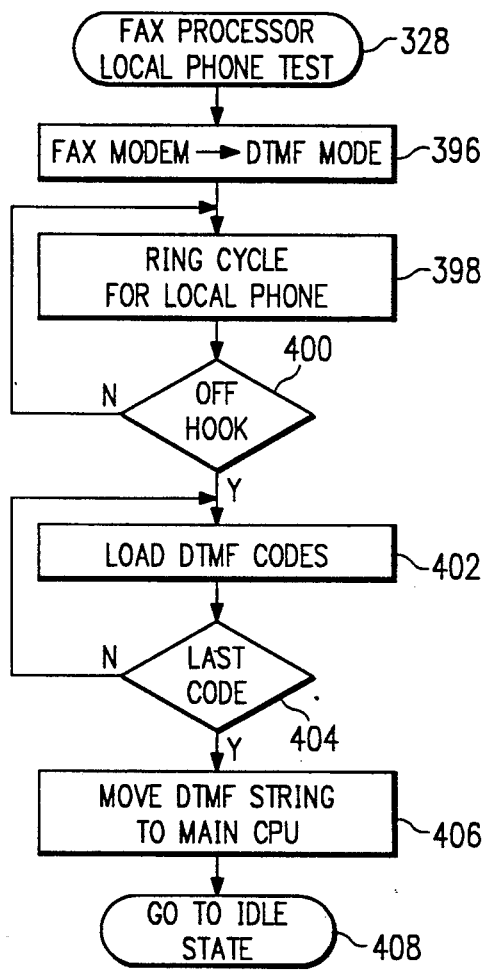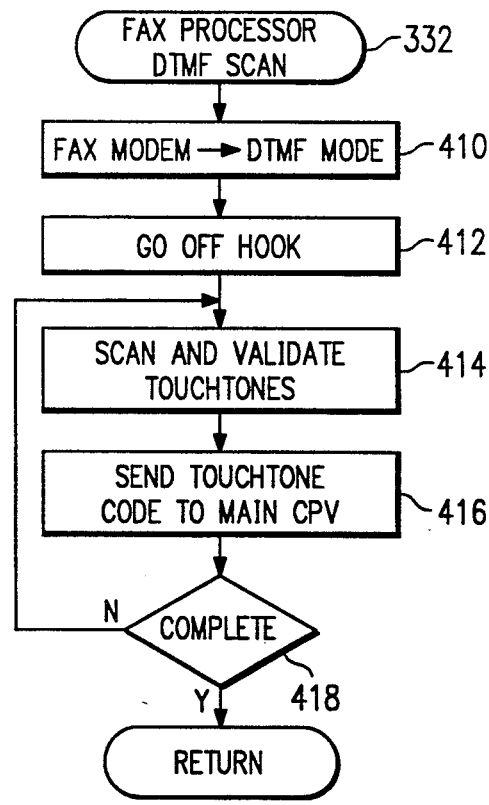

PROTOCOL CONVERTER FOR A SECURE FAX TRANSMISSION SYSTEM

TECHNICAL FIELD OF THE INVENTION

The present invention pertains in general to facsimile systems, and more particularly, to a secure facsimile system utilizing MIL-STD-161 and the interface between a Group III FAX system and a Secure Telephone Unit (STU) for facilitating a secure FAX transmission.

BACKGROUND OF THE INVENTION

In order to transmit facsimile information over the phone lines in some type of secured manner, encrypting is required at one end and decrypting is required at the opposite end. This results in a secure fax transmission. However, most secure transmissions require the same type of hardware on both ends in order to provide compatibility. Due to the large number of different systems that have been in the marketplace for providing secure facsimile transmission, standards have evolved. These standards have primarily come about as a result of secure facsimile by the military community utilizing a Secure Telephone Unit (STU).

Initially, the military standard 188 (MIL-STD-188) existed to cover tactical and long-haul communication system technical standards. However, this later evolved into MIL-STD-188C. Further evolution resulted in a MIL-STD-188-100, a series that covered common standards for tactical and long-haul communications, a MIL-STD-188-200 series covering standards for tactical communications only, and a MIL-STD-188-300 series covering standards for long-haul applications only. The 100 series standards have been primarily directed toward the tactical and long-haul communications, which resulted in the recent military standards MIL-STD-188-161. This military standard provides parameters that are compatible with the mandatory parameters of standardization agreement (STANG) 5000 and CCITT Group 3 equipment. This military standard was issued on Jul. 4, 1988, which superseded the MIL-STD-188-161 standard issued on Jan. 30, 1981. It is generally entitled "Interoperability and Performance Standards for Digital Facsimile Equipment", which military standard is incorporated herein by reference.

When the initial military standard 161 was issued, a number of facsimile equipment manufacturers put out dedicated secured FAX systems. These secure facsimile systems incorporated hardware that would communicate with the STU which was connected to the phone line. This STU is provided by the government, and outputs on an RS232 port a serial data stream that complies with the military standard. However, one disadvantage to most of the secure facsimile equipment is that it is self-contained; that is, the hardware to communicate with the STU was internal to the facsimile machine, and the facsimile machine merely provided an RS232 port for communication. This resulted in a relatively expensive machine, which generally required that the machine on the opposite end of the communication path be essentially the same machine. In fact, in the early days of the MIL-STD-166, most communications required the same machine to be at either end of the communication path. It was only later in the evolution of the machines that they became somewhat compatible.

With the advent of facsimile machines to the general public, the prices for the general Group 3 machines have been decreasing. Therefore, there has been a desire to utilize the relatively inexpensive facsimile machines and provide some kind of interface with the STU. Early attempts at this problem resulted in an interface that would allow the Group 3 facsimile machine to communicate through the STU, but generally required that the opposite end of the communication path also have an interface that was identical. In general, the interface that allowed a generic Group 3 machine to be utilized with a STU would not communicate with anything other than a generic Group 3 machine on the opposite end of the communication path that utilized a similar or identical interface. Once could not communicate with another type of facsimile machine that did not have the interface.

SUMMARY OF THE INVENTION

The present invention disclosed and claimed herein comprises a secure facsimile interface for being disposed between a Group 3 facsimile machine and a secure encryptor/decryptor telephone unit. A first input output port is provided to interface with the Group 3 facsimile machine, and a second input/output port is provided for interfacing with the secure encryptor/decryptor telephone unit. A facsimile processor unit generates the facsimile communication signals for communicating with the Group 3 machine in accordance with the predetermined protocol thereof. An encryptor/decryptor processor unit communicates with the secure encryptor/decryptor telephone unit with the associated protocol thereof. A bulk memory is provided for storing transfer data between the Group 3 facsimile machine and the secure encryptor/decryptor telephone unit on a page basis. A control processor unit controls storage of data in the memory and operates the facsimile processor unit and encryptor/decryptor processor unit in a send mode and in a receive mode. In the send mode, information is received from the Group 3 facsimile machine and stored in the bulk memory on a page basis and subsequently transferred to the secure encryptor/decryptor telephone unit. In the receive mode, data on a page basis is received from the secure encryptor/decryptor telephone unit and stored in the memory and subsequently transferred to the Group 3 machine through the facsimile processor unit.

In another aspect of the present invention, the facsimile processor unit utilizes a facsimile modem for interfacing between the digital domain and the telephone domain of the input/output port which is an RJ11 port. A telephone interface is provided for generating the audio signal necessary to communicate with the Group 3 facsimile machine through the telephone RJ11 port. The facsimile modem is operable to generate the protocol necessary to communicate with the Group 3 facsimile machine. An RS232 interface is provided for the second input/output port, an RS232 port, to generate the various signal levels to communicate with the RS232 protocol, and a bit stream processor is provided for operating in accordance with MIL-STD-188-161, which is the standard applicable to the secure encryptor/decryptor telephone unit. A forward error correction module is provided for operating in accordance with MIL-STD-188-161 to provide error correction for received data and to provide error encoding for transmitted data. The control processor unit interfaces with the error correction module and also with the bit stream processor to transfer data to and from the secure encryptor/decryptor telephone unit through the main memory.

In a further aspect of the present invention, a non-volatile random access memory is provided for storing instructions. The instructions include speed information and error correction information. In one mode, error correction is required, and in another mode, error correction is not required. When error correction is required, the forward error correction module is activated. When not required, it passes through the error correction module unmodified from the bit stream processor to the control processor unit. The control processor unit utilizes the speed information in order to interface between data transmitted/received at one speed by the secure encryptor/-decryptor telephone unit with a different speed of data reception/transmission by the Group 3 facsimile machine. The data is buffered in the main memory to accommodate the different speeds.

BRIEF DESCRIPTION OF THE DRAWINGS

For a more complete understanding of the present invention and the advantages thereof, reference is now made to the following description taken in conjunction with the accompanying Drawings in which:

FIG. 22 illustrates a flowchart of the local phone test in the FAX processor;

FIG. 23 illustrates a flowchart of the scan function in the FAX processor;

DETAILED DESCRIPTION OF THE INVENTION

Figure 1:
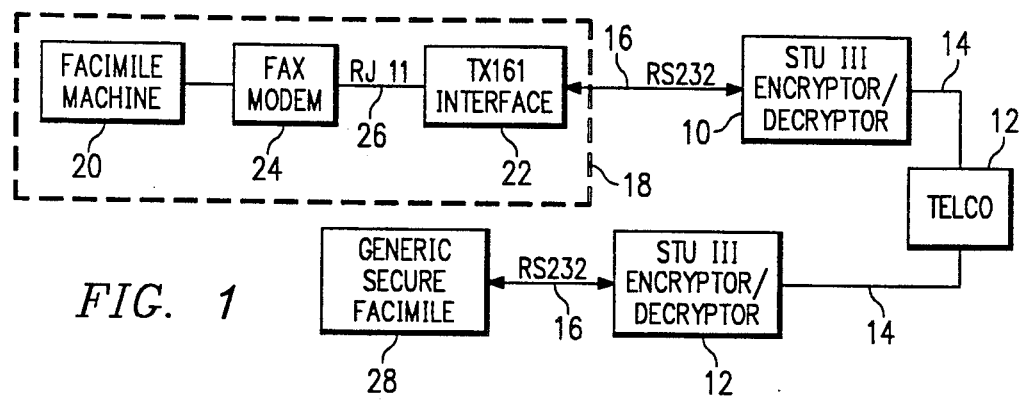
FIG. 1 illustrates a block diagram of a facsimile system utilizing the interface of the present invention.

Referring now to FIG. 1, there is illustrated a block diagram of the secure FAX interface system of the present invention. In a secure FAX system, a secure encryptor/decryptor telephone unit 10 (STU for "Secure Telephone Unit") is provided at either end of the public telephone system 12 and is connected thereto by a conventional RG11 telephone line 12. Each STU 10 can only communicate with another STU on the other side of the telephone system 12. The STU 10 is typically provided by a government entity and is compatable with MIL-STD-188-161. The STU 10 interfaces on the other side thereof through an RS232 serial port 16 with a secure facsimile machine 18. In accordance with the present invention, the secure facsimile (FAX) machine 18 is primarily comprised of a generic Group 3 facsimile machine 20, which is a conventional facsimile machine found in most offices for business purposes. However, the present invention is directed toward an interface 22 that allows the facsimile machine and its FAX modem 24 to interface with the STU 10.

The FAX modem 24 is typically integral with the FAX machine 20, and typically is connectable to a conventional telephone jack through an RG11 cable. The interface 22 is operable to receive on one end thereof an RG11 cable 26 that is connected to the output of the FAX modem 24 and the other side of the interface 22 interfaces with the serial RS232 cable 16. In accordance with the present invention, the secure facsimile machine 18 comprised of the generic facsimile machine 20, associated FAX modem 24 and the interface 22 operable to communicate with any generic secure facsimile machine o the opposite side of the telephone system 12, which facsimile machine is generally referred to by the reference numeral 28. Therefore, a user that desires to interface with the STU 10 on one side of the telephone system 12 to contact a secure facsimile machine somewhere on the telephone system that is interfaced through a similar STU 10 can do so without requiring that the secure facsimile machine 20 have a similar interface 22. This is contrary to previous systems that required identical secure facsimile machines on either side of the telephone system whenever a Group 3 machine was interfaced with the STU 10. Therefore, the invention of the present system is "transparent" to the type of machine that resides on the opposite side of the telephone system, assuming that the secure facsimile machine 28 complies with MIL-STD-188-161 and that it is Group 3.

Figure 2:
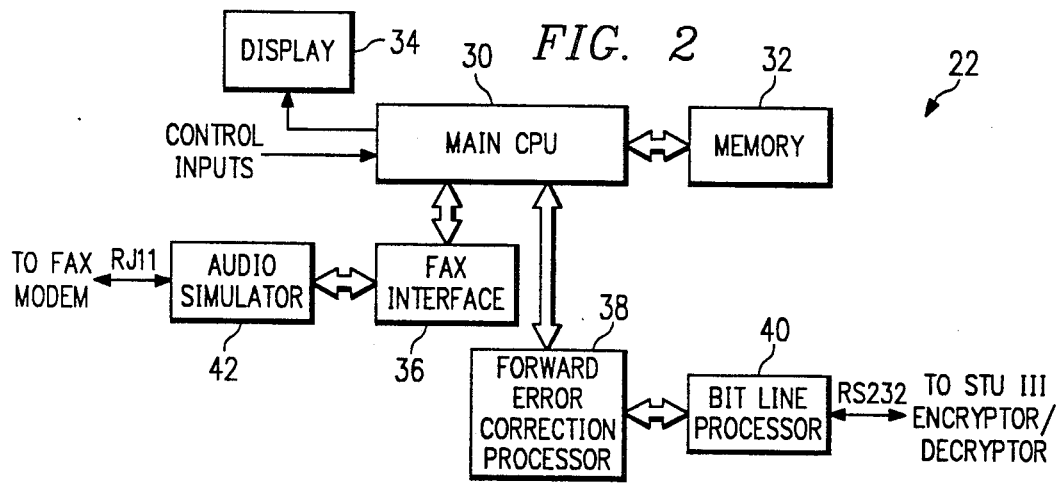
FIG. 2 illustrates a block diagram of the interface system of the present invention.

Referring now to FIG. 2, there is illustrated a simplified block diagram of the interface 22. The interface 22 generally contains a main central processing unit (CPU)

30 that is operable to interface with a main memory 32. The main CPU 30 is operable to drive a display 34 and receive control inputs external to the interface 22 for purposes of setup, as will be described hereinbelow. In order to perform all of the functions necessary to simulate the hardware necessary to create an interface between a Group 3 machine and a STU operating in accordance with MIL-STD-188-161, it is necessary to operate in real time and perform a number of functions. To facilitate this, the preferred embodiment utilizes a parallel processing scheme. The main CPU 30 provides a portion of the parallel processing, which also utilizes a FAX interface 36 to provide the processing on the Group 3 side of the interface 22, a forward error correction processor 38 that provides for error processing in accordance with MIL-STD-188-161 and bit stream processor 40 for providing processing to interface with the protocol of MIL-STD-188-161. The FAX interface 36 is operable to interface with the FAX modem with an audio simulator 42 to simulate the general telephone signals that the FAX modem would normally incur.

In operation, the main CPU 30, the FAX interface 36, the forward error correction 38 and the bit stream processor 40 are operable to communicate through various registers and various handshake protocols. In this manner, each of the blocks 36, 38 and 40 can operate independent with information being transferred back to the main CPU 30. Setup data, etc., is stored in the non-volatile memory associated with the main CPU 30, in addition to data being stored to accommodate the various processing speeds. As will be described hereinbelow, the MIL-STD-188-161 operates on a single page basis and the Group 3 machine operates on a multiple page basis when transmitting, and operates in a single page mode when receiving. Therefore, pages received from the STU 10 must be received at a given rate, stored in memory and then forwarded at a later time to the FAX modem on the Group 3 machine once page reception is complete.

Depending upon the size of the memory 32, the speed at which information is received can be slower than the speed of the Group 3 machine. The control inputs can initially set the speed of the interface such that the interface 22 is set to the speed of the STU 10 on one side and to the speed of the Group 3 FAX machine on the opposite side. In that mode, transfer of pages back and forth between the two can be accommodated with no errors. Further, there is one mode wherein forward error correction is required, which can be recognized by the interface and then forward error correction implemented by the processor 38, as will be described hereinbelow. In general, the interface 22 performs in software all of the functions provided for in MIL-STD-188-161 secure FAX machines that utilize hardware implementation of the interface and through the software connection of the interface 36 allow the information to be transmitted between the Group 3 FAX machine and the STU 10.

Figure 3:
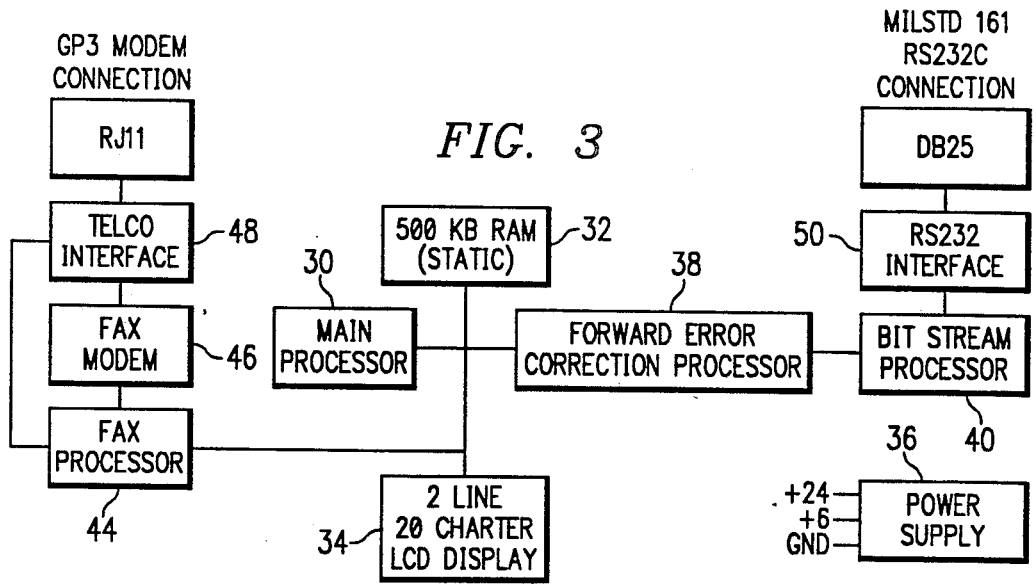
FIG. 3 illustrates a simplified block diagram of the overall architecture of the interface.

Referring now to FIG. 3, there is illustrated a more detailed block diagram of the interface 22 of the present invention, showing the interface between the various process blocks. The main processor 30 can be seen to interface between the forward error correction processor 38 and the FAX processor 44. The FAX processor interfaces with a FAX modem 46, the FAX modem 46 and FAX processor 44 comprising the FAX interface 36. The FAX modem is operable to output its information to a TELCO interface 48, which connects through an RJII cable to a Group 3 modem. The main processor 30 also interfaces with the display 34. It can also be seen that the forward error correction processor 38 only interfaces with the bit stream processor 40, which bit stream processor 40 interfaces with an RS232 interface 50 that interconnects with the STU 10. A power supply 52 is provided that provides a +24 volt output and a +5 volt output.

Figure 4:
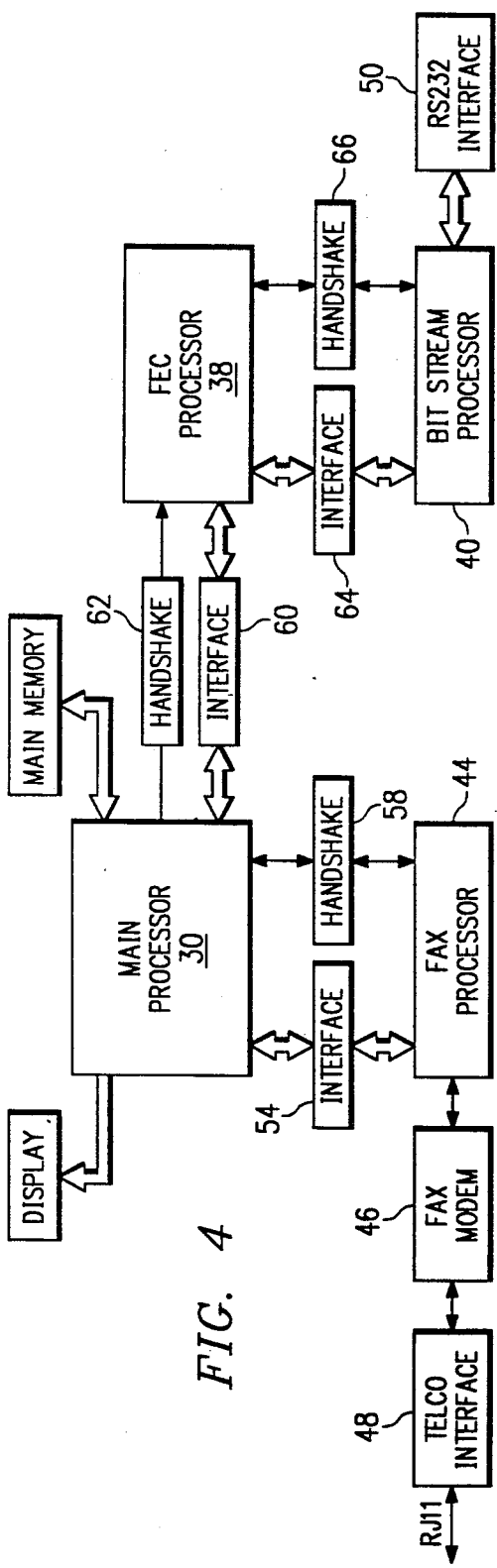
FIG. 4 illustrates a more detailed block diagram of the interface of the present invention.

Referring now to FIG. 4, there is illustrated a more detailed block diagram of the interface 22. The main processor 30 has an interface 54 disposed external thereto for interfacing with the FAX processor 44. The FAX processor 44 and the main processor 30 can utilize the interface 54 to transfer data and instructions therebetween. In addition, handshake instructions are stored in the handshake register 58, which is disposed between the main processor 30 and the FAX processor 44. In a similar manner, an interface register 60 and a handshake register 62 are disposed between the main processor 30 and the FEC processor 38. Also, an interface register 64 and a handshake register 66 are disposed between the FEC processor 38 and the bit stream processor 40.

Figure 5:
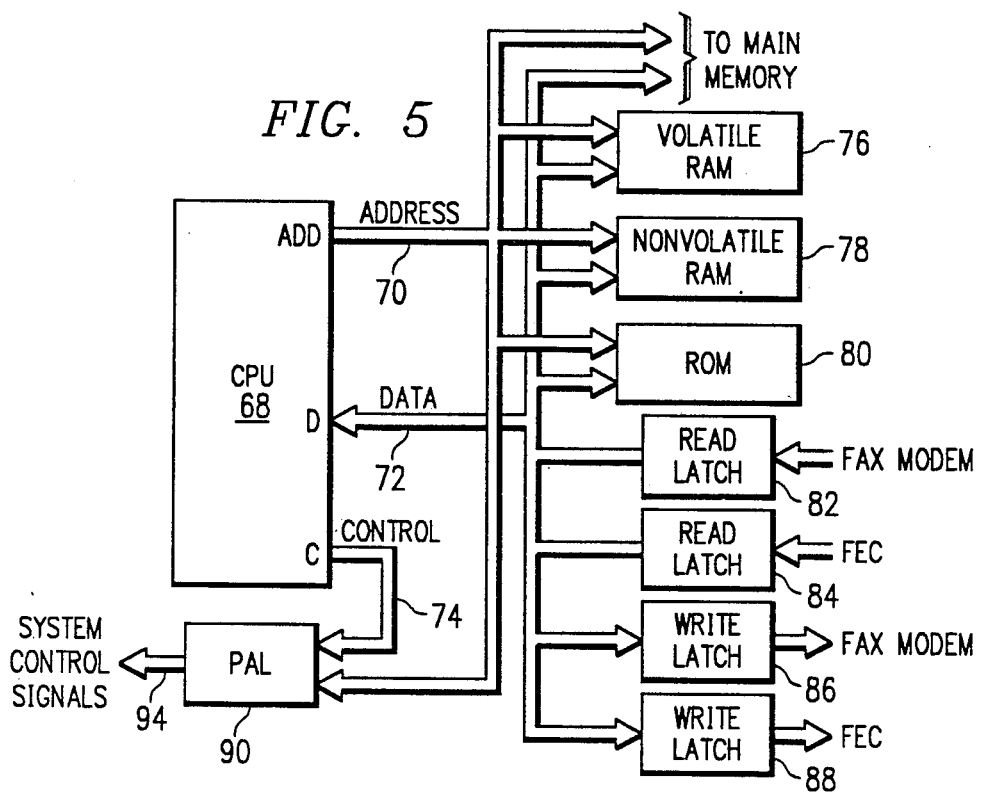
FIG. 5 illustrates a detailed block diagram of the main CPU, illustrating the various elements of the parallel processing system.

Referring now to FIG. 5, there is illustrated a more detailed block diagram of the main processor 30, illustrating the general architecture for each of the parallel process blocks. Each of the parallel process blocks is substantially the same. The main processor 30 is comprised of a CPU 68 that is a conventional microprocessor having address outputs, data inputs/outputs and control inputs/outputs. An address bus 70 is provided to output address signals for the CPU 68. A data bus 72 allows for bidirectional transfer of data between peripheral devices and a CPU 68. Control bus 74 is provided for the output of control signals therefrom.

For each of the processors, Random Access Memory (RAM) is provided for use as scratchpad memory. In the main processor, a volatile RAM 76 is provided, in addition to a non-volatile RAM 78, which RAMs 76 and 78 are interfaced with the address bus 70 and address bus 72. The non-volatile RAM 78 is utilized for setup instructions and generally is provided only on the main processor 30. A Read Only Memory (ROM) 80 is provided for containing program instructions in firmware, which ROM is interfaced with the address bus 70 and data bus 72. A Read Latch 82 is provided for receiving data from the FAX modem and outputting it to the data bus 72. Similarly, a Read Latch 84 is provided for receiving data from the forward error correction processor 38 for output to the data bus 72. When data is written to either the FAX processor or the forward error correction processor, a Write Latch 86 is provided for transferring data from the data bus 72 to the FAX modem, and a Write Latch 88 is provided for transferring data from the data bus 72 to the forward error correction processor 38. The Read Latch 82 and Write Latch 86 comprise the interface 54, and the Read Latch 84 and Write Latch 88 comprise the interface 60.

A Programmable Array Logic (PAL) 90 is provided that interfaces with the control bus 74 and the address bus 70. When an address is input to the PAL 90, the logic configuration stored therein results in certain system control signals being output on an output bus 94. These signals represent handshake instructions to the other processors in the system for reception on their data busses through the respective data interfaces and even control signals for the main processor 30. The PAL 90 is operable to output polling signals, status read signals and various control signals to the other processors to indicate Read operations where they are to send data, or Write operations where they are to receive data. In a similar manner, the other processors in the system have associated PALs which are utilized to generate similar handshake signals that are transmitted to the data buses or the corresponding processors. For example, the FAX modem would output the control signals from its associated PAL to the Read.Latch 82 for receiving signals. Alternately, it could transmit data to the read latch.

Figure 6:
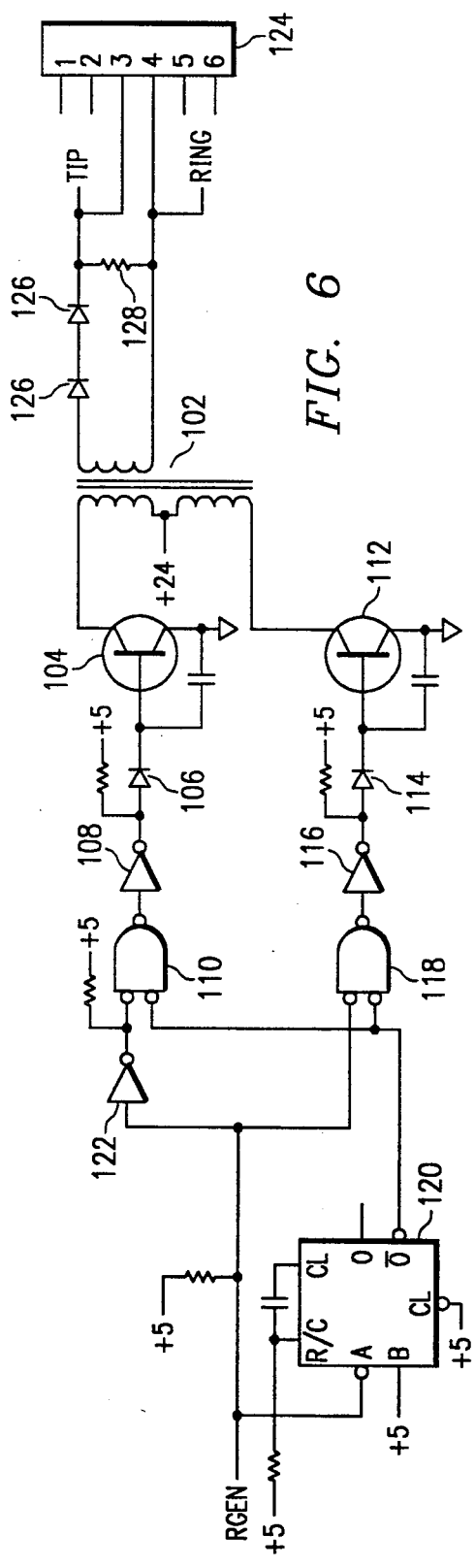
FIG. 6 illustrates a logic diagram of the ring generator of the present invention.

Referring now to FIG. 6, there is illustrated a logic diagram for the TELCO interface 48. A transformer 102 is provided which is operated in a push/pull circuit which sets up excitation around the transformer. A first NPN transistor 104 is provided, having the collector thereof connected to one winding of transformer 102 and the emitter thereof connected to ground. The base of transistor 104 is connected through a series diode 106 to the output of an invertor 108, which is driven by the output of an inverted NAND gate 110. The other side of the primary windings on transistor 102 is connected to the collector of an NPN transistor 112, the emitter of which is connected to ground. The base of transistor 112 is connected through a diode 114 to the output of an invertor 116, which is driven by the output of an inverted NAND gate 118. One input each of both NAND gate 110 and NAND gate 118 are connected to the output of a one-shot circuit 120, which receives a pulse input RGEN. One-shot circuit 120 is a circuit that provides a safety factor in that it provides a pulse repetition rate of at least 20 Hz in order for the circuit to work correctly. This prevents any of the windings from being maintained in an "on" position for any duration of time, in order to prevent overheating of the windings. The other input to NAND gate 110 is connected through an invertor 122 to the RGEN signal, with the other input of NAND gate 118 connected directly to the RGEN signal.

The secondary winding of transformer 102 is connected on one side to one port of an RJII connector 124 with the other side of the winding connected through two series diodes 126 to the other terminal of connector 124. A resistor 128 is connected between the two terminals input to the connector 124.

Figure 7:
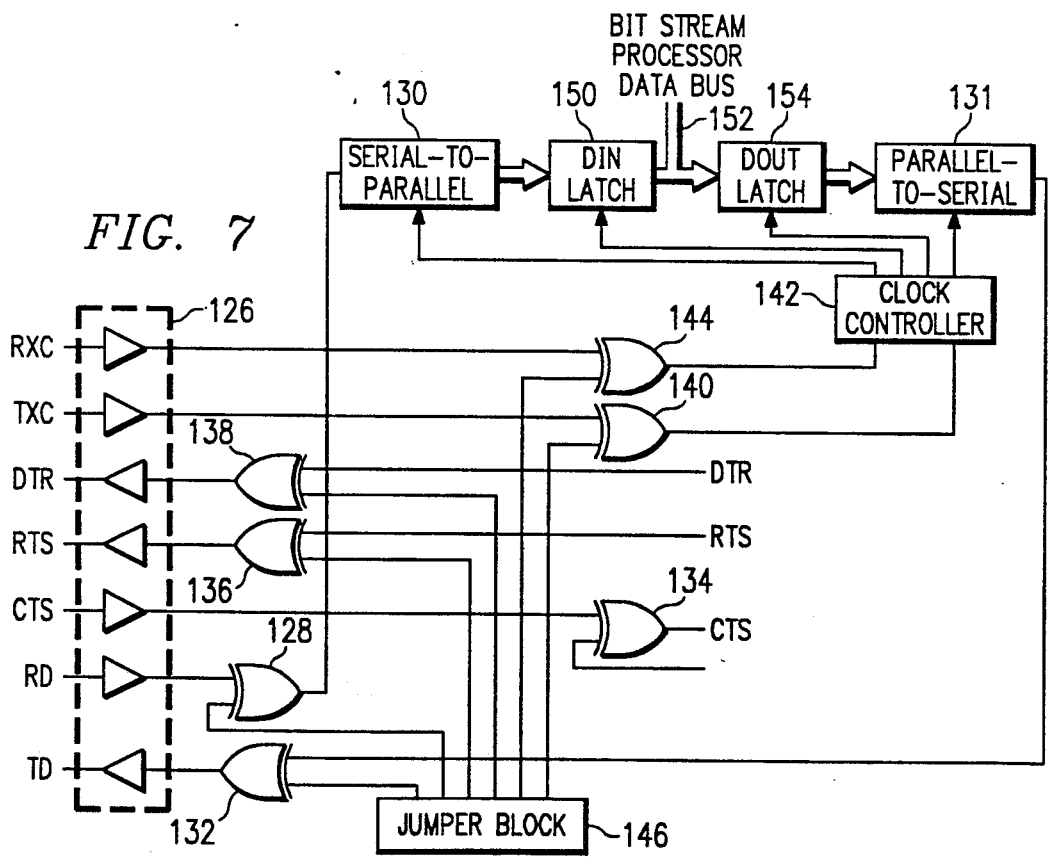
FIG. 7 illustrates a block diagram of the RS232 interface.

Referring now to FIG. 7, there is illustrated a schematic block diagram of the RS232 interface 50. The RS232 signals are comprised of a receive clock signal RxC, a transmit clock signal TxC, a Data Terminal Ready (DTR) signal, a Ready To Send (RTS) signal, a Clear To Send (CTS) signal, Read Data (RD) and Transmit Data (TD). The RxC, TxC, CTS and RD signals comprise input signals which are input to a converter/driver chip 126 which is operable to convert TTL level signals into RS232 C-level conversions. The converter chip 126 is of the type MAX232, manufactured by Maxim. The signals DTR, RTS and TDR are output signals.

The RD signal is input to one side of an exclusive OR gate 128, the output of which is connected to the input of a serial-to-parallel converter 130, which is of the type 74164. Similarly, the TD signal is received from the output of an exclusive OR gate 132, one input of which is received from the output of a parallel-to-serial converter, which is also of the type 74LS374. The CTS signal is input through converter 126 to one input of an exclusive OR gate 134 to output a CTS signal for use by the system as an input, with the RTS and DTR signals input to one input of exclusive OR gates 136 and 138, respectively, for output as the RTS and DTR signals, the RTS and DTR signals received from the system on the input of the exclusive OR gates 136 and 138. The TXC signal is input to one input of an exclusive OR gate 140, the output of which is connected to a clock controller 142 and, similarly, the RXC signal is input to one input of an exclusive OR gate 144, the output of which is connected to the clock controller 142. The other inputs of the exclusive OR gates 128, 132, 134, 136, 138, 140 and 144 are connected to a jumper block 146. The jumper block 146 can have a jumper disposed therein which is operable to determine whether a logic 1 or a logic 0 is connected to the respective input of each of the exclusive OR gates. The jumper block 146 therefore acts as "bit flipper". Essentially, the exclusive OR gates flip the receive line and the transmit line so that they are compatible with different systems.

The output of the serial-to-parallel converter 130 is input to a data-input latch 150, the output of which is connected to the bit stream processor data bus, represented by a reference numeral 152. Similarly, the data bus 152 is input to the D-input of data-output latch 154, the output of which is connected to the parallel output of the parallel-to-serial converter 131. The latches 150 and 154 are of the type 74LS374. The serial-to-parallel converter 130, parallel-to-serial converter 131, and the latches 150 and 154 are controlled by the clock controller 142. The clock controller 142 contains a clock counter that shifts data through every eight clock cycles, and on the eighth clock jam-transfers data through latch 150. This allows the system to latch specific incoming data patterns and then synchronize the data patterns so that an even eight-bit transfer is achieved once the pattern is distinguished, as will be described hereinbelow. For outgoing data, the operation is just the opposite of the input operation in which the data-output latch 154 acts as a holding register with the input thereof connected to the parallel input of the parallel-to-serial converter with the timing and countdown handled by synchronous counters in the clock controller 142. Essentially, the synchronous counters (not shown) are of the type 74LS161, which are internal to the clock controller 142. An internal programmable array logic (PAL) device is provided (not shown) which decodes the outputs of the counters to generate the timing signals. In addition, the internal PAL also decodes the output of the converters to generate the clock signal for the latch 150 and also the timing signals for the serial-to-parallel converter 130.

Figure 8:
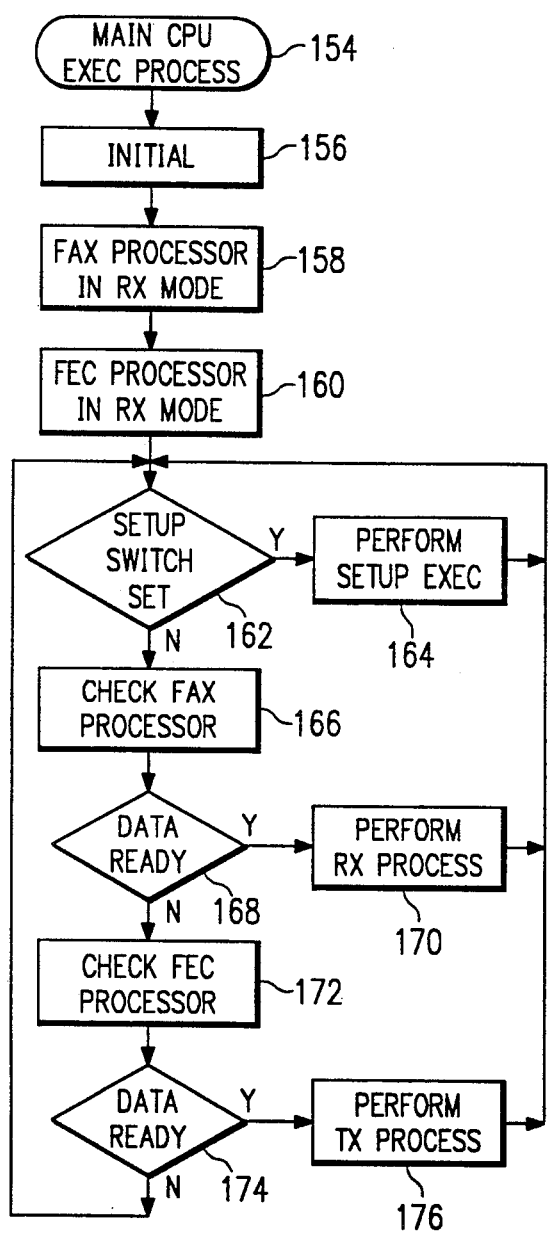
FIG. 8 illustrates a flowchart for the main processor execution process.

Referring now to FIG. 8, there is illustrated a flowchart for the main CPU execution process, which is initiated at a start block 154 and then proceeds to a block 156 for initialization. The program then flows to a block 158 to place the FAX processor in the receive mode by transmitting handshake signals thereto. The program then flows to a function block 160 to set the FEC processor in the receive mode in a similar manner. The program then flows to a decision block 162 to determine if the setup switch is set, which indicates that a setup procedure has previously been performed and stored in the nonvolatile memory associated with the main CPU. If the setup switch has been set, the program would proceed along the "Y" path, which indicates that a setup is necessary, to a function block 164, indicating the performance of the setup execution routine. The program then flows back to the input of decision block 162. However, if the switch has not been set, indicating that setup instructions are stored in the nonvolatile RAM, the program flows to a function block 166 to check the FAX processor. The program flows to a decision block 168 to determine if data is ready. If so, the program flows along the "Y" path to a function block 170 to perform the transmit process and then back to the input of the decision block 162.

The program flows along the "N" path from data ready block 168 if no data is ready to be transmitted to a function block 172 to check on the FEC processor. The program then flows to a data ready decision block 174 to determine if data is ready to be transmitted to the FEC processor. If so, the program flows along the "Y" path to a function block 176 to transmit data and then back to the input of decision block 162. If data is not ready, the program flows along the "N" path from decision block 174 to the input of decision block 162. During receipt of data by the main CPU, the main CPU essentially determines if the FAX processor and the FEC processor are in the transmit mode and then performs a similar process to receive data.

Figure 9:
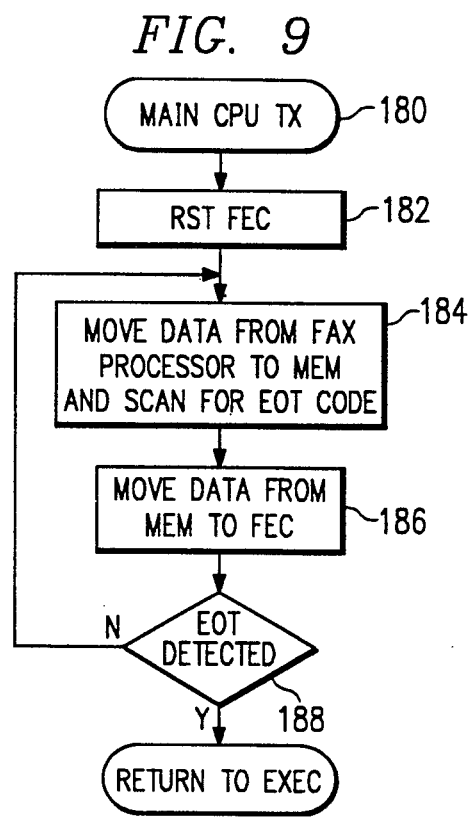
FIG. 9 illustrates a flowchart for the main processor transmit process.

Referring now to FIG. 9, there is illustrated a flowchart for the transmission operation on the main CPU, as initiated in a block 180, which then flows to a block 182 to reset the FEC processor. The program then flows to a function block 184 wherein a single data byte is moved from the FAX processor to the bulk memory, and then the end of transmission code (EOT) scanned for. The program then flows to a function block 186 to move the data byte in the bulk memory to the FEC processor. The program then determines whether EOT is detected, as indicated by decision block 188. If not, the program flows along the "N" path back to the input of function block 184 and, if so, the program returns to the execution routine.

Figure 10:
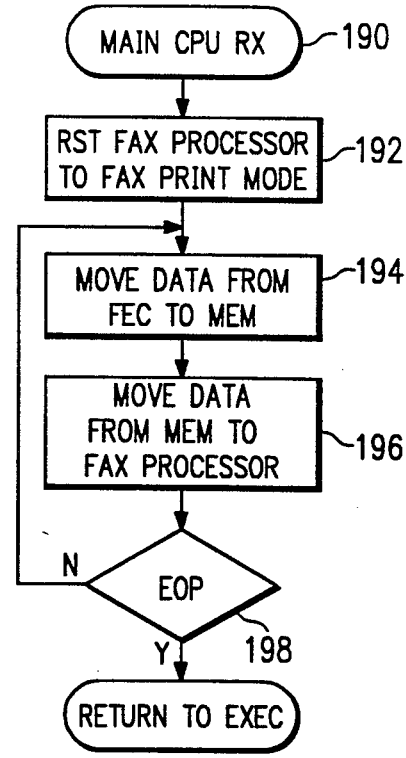
FIG. 10 illustrates a flowchart for the main processor receive process.

Referring now to FIG. 10, there is illustrated a flowchart for the receive process of the main CPU, as initiated in a start block 190. The program then flows to a function block 192 to reset the FAX processor to the FAX print mode. The program then flows to a function block 194 to move data from the FEC processor to the bulk memory, and then the program flows to a function block 196 to move data from the bulk memory to the FAX processor. The program then determines whether the end of page (EOP) signal has been received, as indicated by a decision block 198. If EOP has not been received, the program flows along an "N" path back to the function block 194 and, if received, the program returns to the main execution routine.

Figure 11:
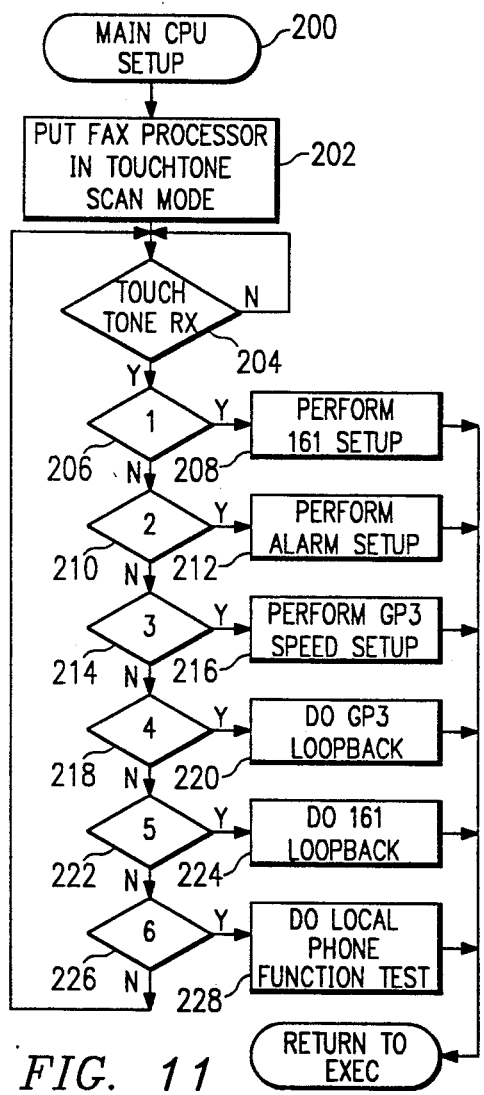
FIG. 11 illustrates a flowchart for the main processor setup.

Referring now to FIG. 11, there is illustrated a flowchart for the main CPU setup program for storing information in the nonvolatile RAM, which is initiated at a start block 200 and then flows to a function block 202 to place the FAX processor in the touchtone scan mode. As described above, a conventional touchtone telephone can be connected to the RJ11 jack on the 161-interface 22 in place of the Group 3 FAX modem. Of course, most Group 3 FAX modems have touchtone pads associated therewith. In any event, it is only necessary to provide an input of touchtone signals. The program in FIG. 11 determines when the touchtone signals have been received, as indicated by a decision block 204. When received, the program flows to a decision block 206 to determine if a "1" has been received. If so, the 161 setup is performed, as indicated by the function block 208. If a "2" has been received, as indicated by a decision block 210, the alarm setup is performed as indicated by function block 212. If a "3" is received, as indicated by a decision block 214, the Group 3 speed setup is performed, as indicated by function block 216. If a "4" has been received, as indicated by a decision block 218, the Group 3 loopback test is performed, as indicated by a function block 220. If a "5" has been received, as indicated by a decision block 222, the 161 loopback test is performed, as indicated by a function block 224. If a "6" has been received, as indicated by a decision block 226, a local phone function test is performed, as indicated by a function block 228. After more and more of the test has been performed, the program returns to the main execution routine. If none of the numerals 1-6 have been received, the program returns back to the input of decision block 204 to wait for the appropriate digit to be received.

Figure 12:
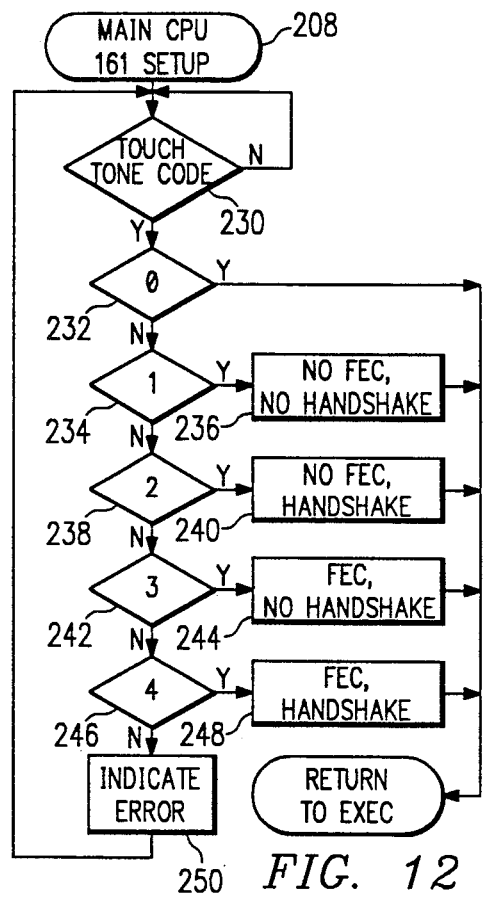
FIG. 12 illustrates a flowchart for the main processor 161 setup.

Referring now to FIG. 12, there is illustrated a flowchart for the 161 setup in function block 208. The program flows to a decision block 230 to wait for a touchtone code. When received, the program flows to a decision block 232 to determine if a "0" has been entered and, if so, the program returns to the main execution routine. If not, the program flows to a decision block 234 to determine if a "1" has been received. If so, the program flows to a function block 236 to store information in the nonvolatile memory that no error correction is required and no handshake is required. If a "2" has been entered, as indicated by decision block 238, the program flows to a function block 238 indicating storage of information to indicate that no error correction is required, but a handshake is required. If a "3" has been entered, as indicated by decision block 242, the program flows to a function block 242 to indicate that error correction is required, but no handshake is required. If a "4" has been entered, as indicated by a decision block 246, the program flows to a function block 248 indicating that error correction is required and a handshake is required. If none of the digits 0-4 have been received, the program flows to a function block 250 to indicate an error on the display and then returns back to the input of the decision block 230. Once the setup has been completed, the program will flow back to the execution routine.

Figure 13:
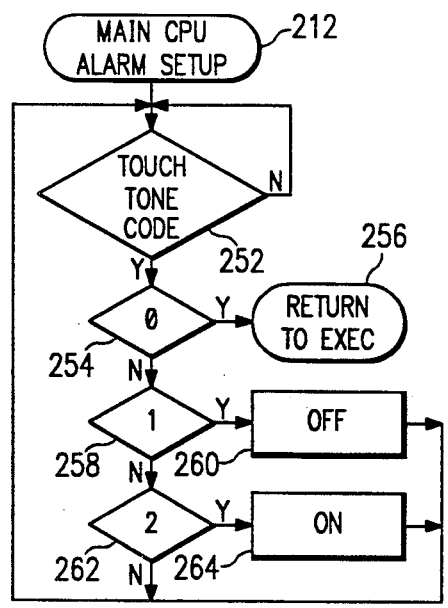
FIG. 13 illustrates a flowchart for the main processor alarm setup.

Referring now to FIG. 13, there is illustrated a flowchart for the alarm setup of function block 212. The program will flow to a decision block 252 to wait for touchtone code, which, when received, would then determine if a "0" had been entered, as indicated by the decision block 254. If so, the program would flow to the execution routine. If not, the program would flow to a decision block 258 to determine if a "1" was entered, indicating that the alarm is off, as indicated by a function block 260, or the program would flow to a decision block 262 to determine if a "2" has been entered, which would indicate by function block 264 that the alarm was on. After the two flags have been sent, indicating an off state or an on state, the program would flow back to the input of the decision block 252.

Figure 14:
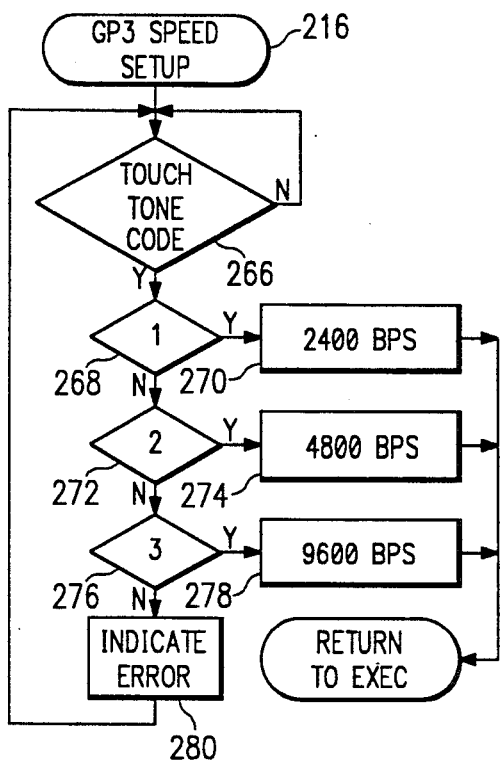
FIG. 14 illustrates a flowchart for the main processor speed setup.

Referring now to FIG. 14, there is illustrated a flowchart for the speed setup function block 216 which would then flow to a decision block 262 to wait for a touchtone code and then to a decision block 268 to determine if a "1" has been entered. If so, the program would flow to a function block 270 to set the speed of operation to 2400 BPS. If a "2" was entered, as indicated by the function block 222, the program would flow to a function block 274 wherein the speed would be set to 4800 BPS. If a "3" was entered, as indicated by a decision block 276, the program would flow to a decision block 278 to set the speed to 9600 BPS. If neither a "1", a "2", nor a "3" was entered, the program would flow to a function block 280 to indicate an error on a display and then flow back to the input of decision block 266. Once the speed has been entered, the program flows to the main execution routine.

Figure 15:
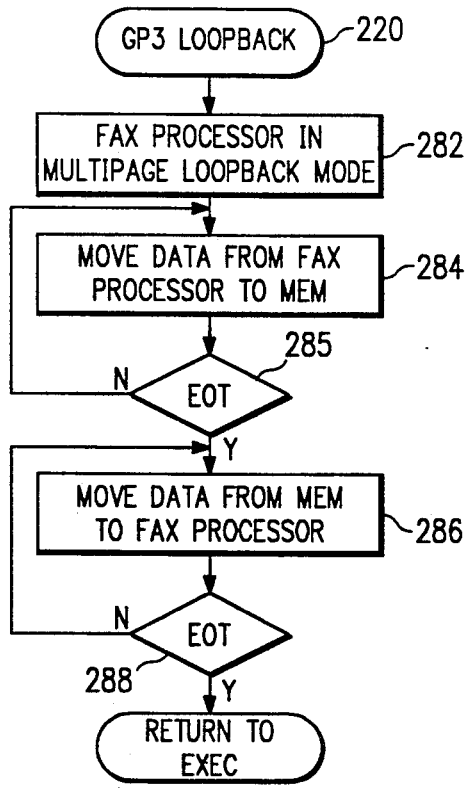
FIG. 15 illustrates a flowchart for the loop back mode of the main processor, including the Group 3 machines.

Referring now to FIG. 15, there is illustrated a flowchart for the loopback of function block 220, which would first place the FAX processor in the multipage loopback mode, as indicated by function block 282. Data would then be moved from the FAX processor to the bulk memory, as indicated by the function block 284 and then the system would wait for an EOT signal, as indicated by function block 286. The program would continue to move data until the EOT is received, at which time the program would flow to a function block 286 to move data from the bulk memory to the FAX processor. Data would continue to be received until an EOT signal was received, as indicated by a decision block 288, and then the program would flow back to the main execution routine.

The Group 3 loopback mode allows a transmission to be transmitted to the 161-interface 22 and, in the next transmission, be transmitted back for printing on the local FAX machine. In this manner, the FAX processor, the FAX modem, the TELCO interface, etc. can be tested out.

Figure 16:
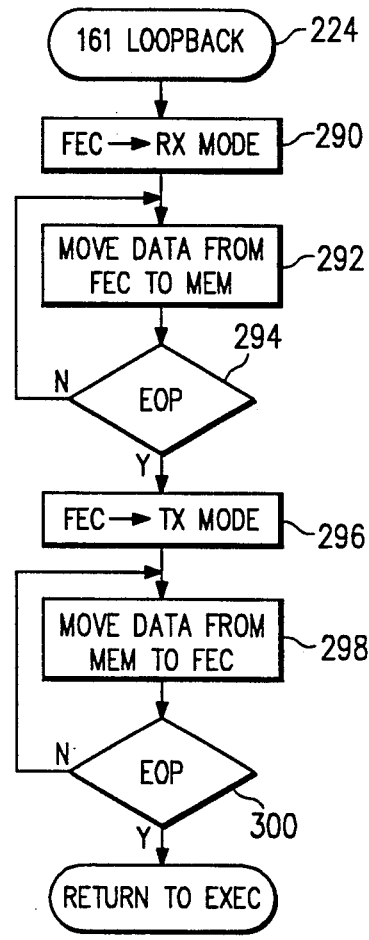
FIG. 16 illustrates a flowchart for the loop back mode on the main processor to test the 161 interface.

Referring now to FIG. 16, there is illustrated in a flowchart for the 161 loopback test of function block 224, which first requires the FEC processor to be set into the receive mode, as indicated by a function block 290. The program then flows to a function block 292 to move data from the FEC processor to the bulk memory. This movement of data continues until an EOT is received, as indicated by decision block 94. When the EOT is received, the program flows to a function block 296 to set the FEC processor in the transmit mode, and then to a function block 298 to move data from the bulk memory to the FEC processor. This data transfer continues until an EOT has been received, as indicated by a decision block 300. Once received, the program returns to the main execution routine.

Figure 17:
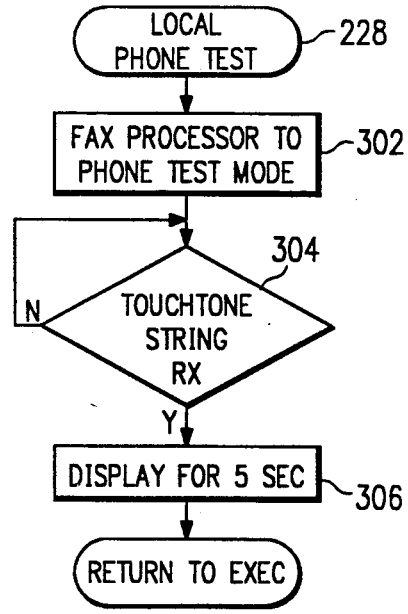
FIG. 17 illustrates a flowchart for the local phone test of the main processor.

Referring now to FIG. 17, there is illustrated a flowchart for the local phone test of the function block 220, which first requires the FAX processor to be set into a phone test mode, as indicated by a function block 302. The program flows to a decision block 304 to wait for a touchtone string to be received from the RJ11 port, which, as described above, can be entered either through a touchtone pad on a Group 3 local FAX or through a separate phone connected to the RJ11 input. When a touchtone string has been received, it is displayed on the display for five seconds, as indicated by function block 306. The program then returns to the main execution routine.

Figure 18:
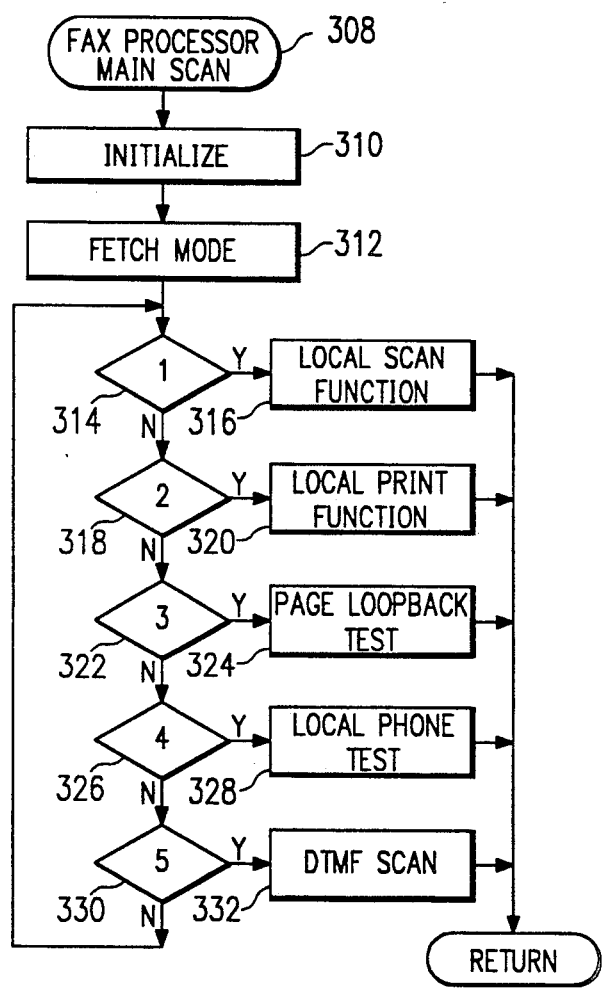
FIG. 18 illustrates a flowchart of the main scan program in the FAX processor.

Referring now to FIG. 18, there is illustrated a function block for the FAX processor main scan operation, which is initiated at a start block 308. The processor is first initialized, as indicated, by a function block 310 and then put into a fetch mode, as indicated by function block 312. The program flows to a decision block 314 to determine if a "1" has been scanned. If so, the program flows to a function block 316 to place the Group 3 facsimile machine into a transmit mode to transmit to the TX161-interface 22. If a "2" was scanned, as indicated by function block 318, the program would flow to a function block 320 to perform a local print function, wherein data would be received. If a "3" were scanned, as indicated by a function block 322, the program would flow to a function block 324 to perform a page loopback test. If a "4" were scanned, as indicated by a decision block 326, the program would flow to a function block 328 to perform a local phone test. If a "5" were scanned, as indicated by a function block 330, the program would flow to a function block 332 to perform a DTMF scan. This will continue until one of the functions has been selected.

Figure 19:
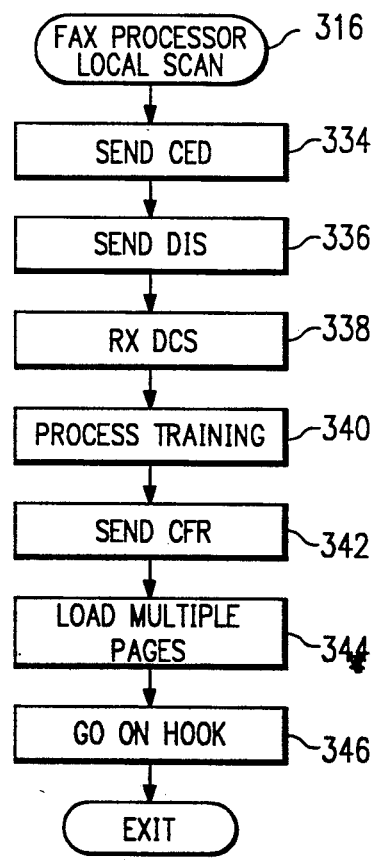
FIG. 19 illustrates a flowchart of the local FAX scan function in the FAX processor.

Referring now to FIG. 19, there is illustrated a flowchart for the local scan function block 316. The program would flow to a function block 334 to send the CED signal and then to a function block 336 to send the Digital Identification Signal (DIS) and then to a function block 338 to receive the Digital Capability Signal (DCS). The program would then flow to a function block 340 to process the training information and then to a function block 342 to send a Confirmation for Receive (CFR) signal. Once the CFR has been sent, the system will then load multiple pages to the main processor for storage in the bulk memory, as indicated by function block 344 and then, the system would go on hook, as indicated by a function block 346. The program would then exit.

Figure 20:
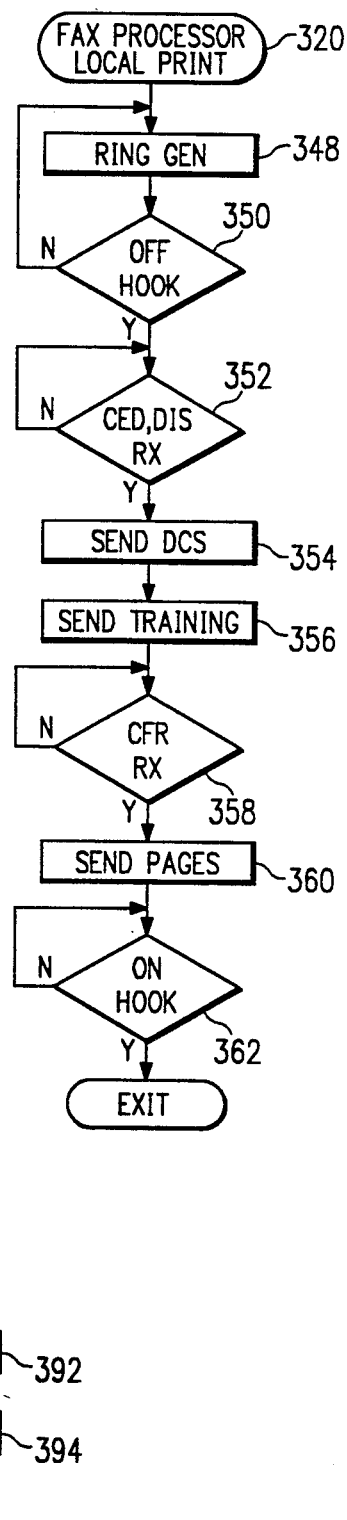
FIG. 20 illustrates a flowchart of the local print function in the FAX processor.

Referring now to FIG. 20, there is illustrated a flowchart for the local print function of function block 320. The program would first flow to a function block 348 to generate a ring signal and then to a decision block 350 to determine if an off hook signal has been received. If not, the program would continue to generate the ring signal. When an off hook is detected, indicating that the local Group 3 FAX machine has responded, the program flows to function block 352 to determine if the CED and DIS signals have been received. When received, the program flows to a function block 354 to send the DCS signal and to a function block 356 to send the training information. The program would then flow to a decision block 358 to determine if the CFR signal has been received. When it has been received, the program flows to a function block 360 to send the stored pages of information that are contained in the bulk memory, which, as described above, are first routed by the main processor to the FAX processor through the FAX modem and finally to the Group 3 FAX machine. The program would then flow to a decision block 362 to wait for an on hook condition, as which time it would exit. Both the flowchart of FIG. 19 and the flowchart of FIG. 20 incorporate the standard T30 protocol for the Group 3 FAX machines.

Figure 21:
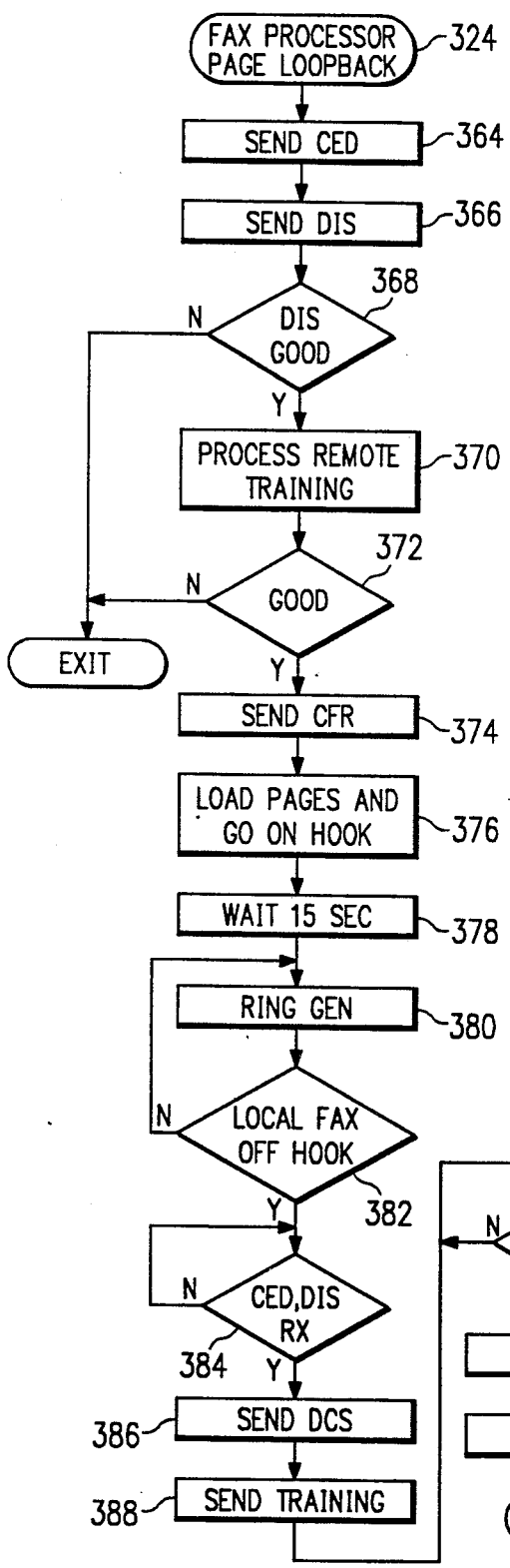
FIG. 21 illustrates a flowchart of the loop back test in the FAX processor.

Referring now to FIG. 21, there is illustrated a flowchart for the page loopback test mode of function block 324. The CED would first be sent, as indicated by a function block 364, and then the DIS signal, as indicated by a function block 366. A decision block 368 would determine whether the DIS is good. If not, the program would exit and, if so, the program would flow to a function block 370 to process the remote training information that was received. If this operation failed, the program would exit, as indicated by a decision block 372. However, if the training process provided adequate results, the program would flow to a function block 374 to send the CFR signal, as indicated by a function block 374. The pages would then be loaded to the bulk memory of the main processor, as indicated by function block 376, and then the system would go on hook. A delay of fifteen seconds is incorporated, as indicated by a function block 373, at which time the ring signal was generated, as indicated by a function block 380. This continues until the local FAX goes off hook or fifteen ring cycles have occurred, as indicated by a decision block 382. The program would then flow to a decision block 384 to wait for the CED and DIS signals to be received. Once received, the DCS signals are sent, as indicated by a function block 386 and then the training information would be sent, as indicated by a function block 388. The system would then wait for a CFR signal to be received, as indicated by a decision block 390 and then the program would send pages and go on hook, as indicated by function blocks 392 and 394, respectively. The program would then exit.

Referring now to FIG. 22, there is illustrated a flowchart for the local phone test of function block 328. The FAX modem is first placed into the DTMF mode as indicated by function block 396 and then the ring cycle is entered for the local phone, as indicated by function block 328. The ring cycle continues until the local phone goes on hook, as indicated by a decision block 400, at which time the program goes to a function block 402 to load the DTMF codes into local FAX processor memory, it being noted that each of the processors has scratchpad memory associated therewith. The program then waits for the last code number to be received, as indicated by a decision block 404 and, when this is received, the program flows to a function block 406 to move the DTMF string to the main processor. The system then goes into an idle state, as indicated by block function 408.

Referring now to FIG. 23, there is illustrated a flowchart for the FAX processor DTMF scan of function block 332. The FAX modem is first placed in the DTMF mode as indicated by a function block 410 and then the system goes off hook, as indicated by a function block 412. The line is then scanned and the touchtones validated, as indicated by a function block 414 and then the touchtones are sent to the main processor, as indicated by the function block 416. This continues until all of the touchtone codes have been validated and sent to the main CPU, as indicated by a decision block 418, after which the program returns to the main scan program.

As described in the MIL-STD-188-161, the facsimile equipment must be capable of operating in a number of modes, an uncompressed mode and a compressed mode with forward error correction (FEC). In the uncompressed mode, the facsimile data is transmitted by PEL, with data consisting of a synchronization code followed by a number of PELs which will be in a sequence of two predetermined code words. In the compressed mode, the data is transmitted after compression by a redundancy reduction algorithm. Data is composed of a series of variable length code words with each code word representing a run-length of either all white or all black. White runs and black runs will alternate with data lines beginning with a white run-length code word to ensure that the receiver maintains color synchronization. The code words are of two types, a terminated code word and a makeup code word. In the compressed mode with forward error correction, the data is further processed by a channel coder and a bit interleaving buffer to provide the forward error correction (FEC). The channel encoder utilizes a Bose Chanduri Hocquenghem (BCH) forward error correction encoder with capability of correcting two error bits per block. The syndromes of the BCH decoder are well known. An encoder is realized in the software to encipher the facsimile data utilizing the BCH code. This is also a conventional technology. Similarly, a decoder is realized in the software to decode the enciphered facsimile data. The interleaving buffer is necessary to improve the error correcting capability of the channel encoder, especially considering transmission errors clustered in bursts. The buffer is a matrix of $63 \times 5$ or 315 bits. Data input occurs in a line-by-line format with the data output occurring in a column-by-column format, with there being 63 columns and 5 rows or lines. The data input sequence is:

$D_0, D_1 \ldots D_{313}, D_{314}$ Accordingly, the data output is: $D_0, D_{63}, D_{126}, D_{189}, D_{252}, D_{64} \ldots D_{188}, D_{251}, D_{314}$ At the receiving side, the data input and data outputs are the reverse of the transmitting side.

The transmitted BCH-encoder and interleaving buffer, respectively, are synchronized with the receiving BCH-decoder and interleaving buffer before starting transmission of encoded facsimile data. The FEC control block is the synchronization SOM sequence when the BCH-decode and interleaving buffer are utilized. The synchronization process utilizes a number of steps. In a first step, the transmitter sends the synchronization SOM sequence without using the BCH-encoder and interleaving buffer. Immediately after synchronization of the SOM sequence, the transmitter utilizes the BCH-encoder and interleaving buffer to send encoded facsimile data. At the receiver, the incoming signal is initially monitored bit-by-bit, by using the BCH-decoder and interleaving buffer. When the first synchronization SOM sequence is detected, synchronization is achieved, and thereafter, the BCH-encoder and interleaving buffer are used. Block synchronization can be achieved at a number of points within the control header. After the detection of any block synchronization point in the control header, incoming data is then allowed to pass through the BCH-decoder and interleaving buffer to the source decoder. Therefore, the 315-bit FEC block represents the construction of the interleaving buffer.

Figure 24:
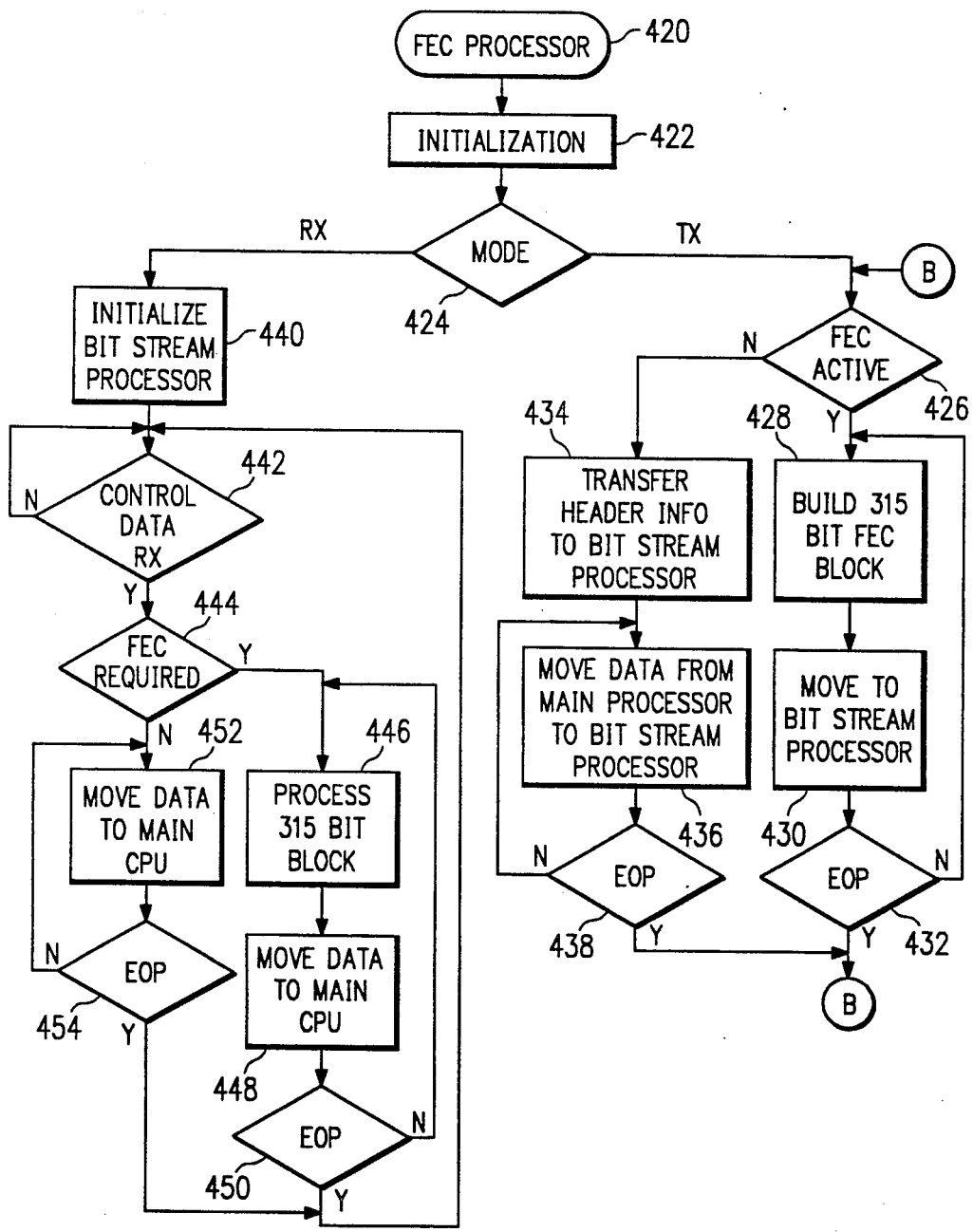
FIG. 24 illustrates a flowchart of the FEC processor initialization.

Referring now to FIG. 24, there is illustrated a flowchart for the FEC processor operation, which is initiated at a starting block 420, which initializes the system in a function block 422. A decision block 424 indicates which mode is selected, the receive mode or the transmit mode. If the transmit mode is selected, the program flows along a TX path to a decision block 426 to determine if the error correction feature is active. If so, the program flows along the "Y" path to a function block 428 to build the 315 bit block. Thereafter, the program flows to a function block 430 to move the 315 bit block to the bit stream processor. This movement of data continues until the EOP is received, as indicated by a decision block 432. The program then flows back to the input of the decision block 426.

If the FEC was not active, thus requiring no error correction the program would flow along an "N" path from decision block 426 to a function block 434 to transfer the header information to the bit stream processor and then to a function block 436 to move data from the main processor to the bit string processor. This will continue until the EOP signal is received, as indicated by a decision block 438, at which time the program would flow back to the input of the decision block 426.

When the FEC processor is in the receive mode, the program would flow from the decision block 424 along the Rx path to a function block 440 to initialize the bit stream processor. When the bit stream processor is initialized, the program flows to a decision block 442 to wait for the control data to be received. When received, the program flows to a decision block 444 to determine if error correction is required. If so, the program flows to a function block 446 to process a 315-bit FEC block and then to a function block 448 to move data to the main CPU. Data is moved until the EOP signal has been received, as indicated by a decision block 450, at which time the program flows back to the input of the decision block 442 to wait for the next control data.

If error correction is not required, the program would flow from the decision block 444 along the "N" path to a function block 452 to move data to the main CPU. This data continues to move until an EOP signal is received, as indicated by decision block 454, at which time the program flows back to the input of the decision block 442 to wait for new control data.

Figure 25:
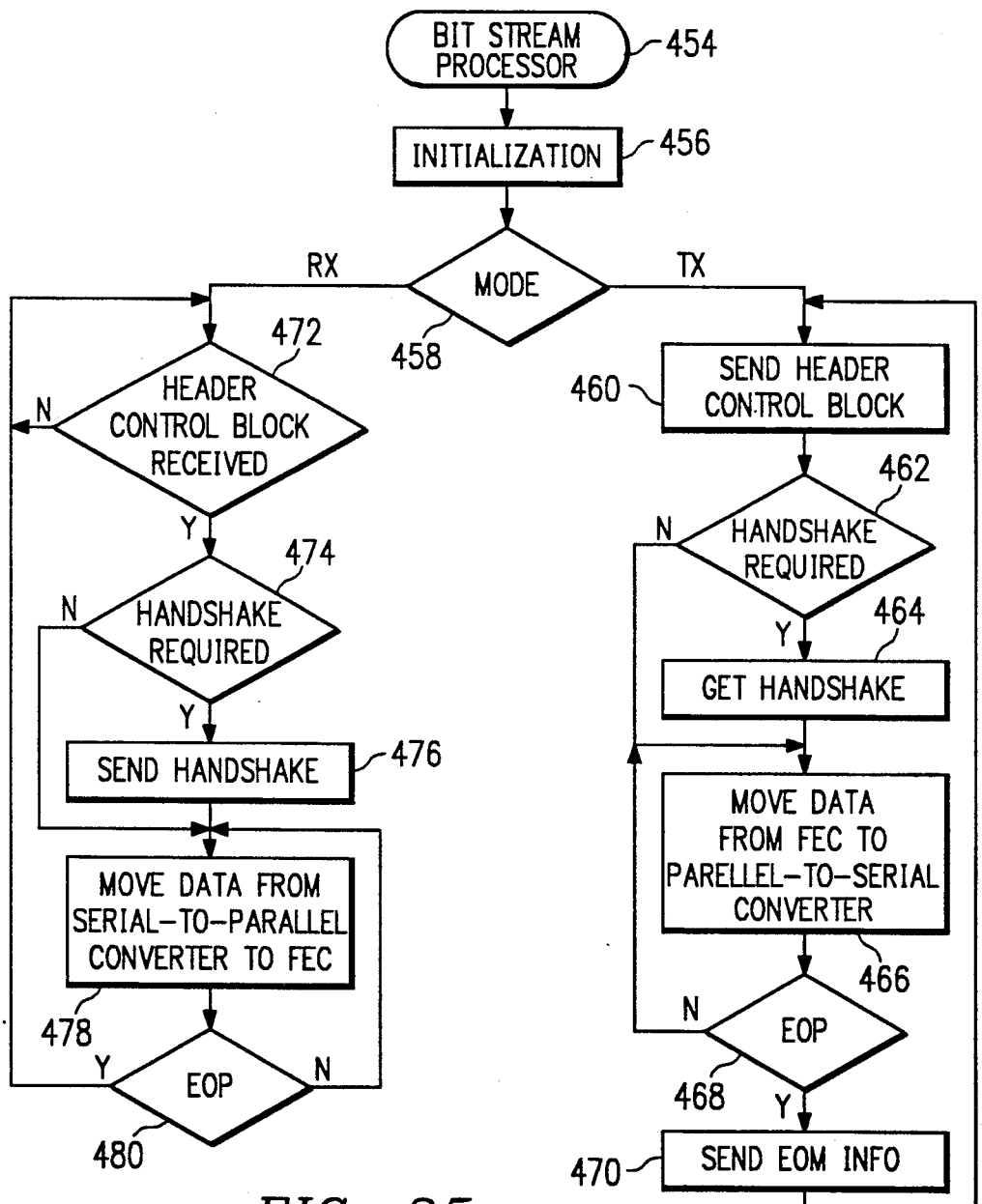
FIG. 25 illustrates a flowchart of the bit stream processor.

Referring now to FIG. 25, there is illustrated a flowchart for the bit stream processor operation which is initiated at a start block 454 and then flows to a function block 456 to initialize the system. A decision block 458 indicates the decision whereby it is determined whether the bit stream processor is in a receive mode or a transmit mode and, if in a transmit mode, the program flows along a Tx path to a function block 460 to send the header control block. A decision block 462 determines whether the handshake is required, as indicated by the setup information stored in the nonvolatile RAM in the main CPU 30. If so, a handshake is received, as indicated by a function block 464 and, if not, both the output of function block 464 and the decision block 462 flow to a function block 466 to move data from the FEC to the parallel-to-serial converter. This movement of data continues until the EOP signal has been received, as indicated by a decision block 468. The EOP information is then sent, as indicated by a function block 470. The program then flows back to the input of function block 460 to send another header control block. This continues until all data is sent.

In the receive mode, the program flows from the decision block 458 along the Rx path to the input of a decision block 472, which determines whether the header control block has been received. When the header control block has been received, the program flows to a function block 474 to determine if the handshake is required. If so, the program flows to a function block 476 to send the handshake and, if not, both the decision block 474 and the function block 476 flow to the input of the function block 478 to move the data from the serial-to-parallel converter through the FEC processor. This movement of data continues until the EOP signal has been received, as indicated by a decision block 480. Once received, the program then flows back to the input of decision block 472.

Figure 26:
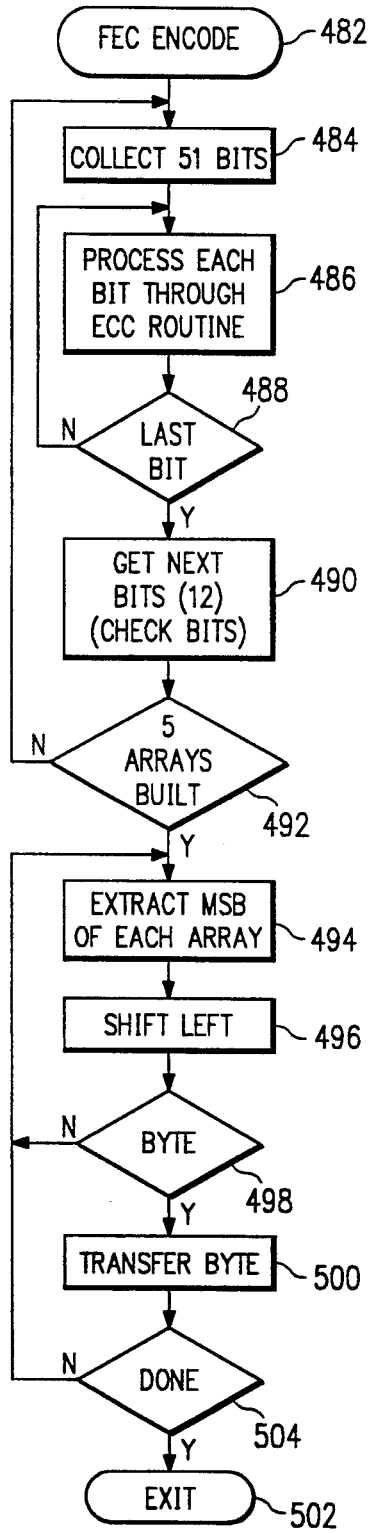
FIGS. 26 and 27 illustrate flowcharts of the overall operation of the FEC encode/decode process.

Referring now to FIG. 26, there is illustrated a flowchart for an FEC encode operation which is initiated at start block 482. Bytes of data are then converted to a bit string and then the first fifty-one bits in the string are collected, as indicated by a function block 484. As each bit is collected, it is processed through an Error Correction Code routine (ECC), that is essentially a BCH 6351 code which is well known in the art. This is indicated by function block 486. The program then flows to a decision block 488 to determine if the last bit in the fifty-one bits has been collected. If not, the processing continues until all fifty-one bits are processed. The program then flows along a "Y" path to a function block 490 to get the next twelve bits, which next twelve bits are the check bits. These are the error bits that make up the entire array, of which there are five. These five arrays are utilized for the interleaving buffer described above. After the first array has been built, the program flows to a decision block 492 to determine if all five arrays have been built to provide a 315 bit FEC block. If not, the program flows along the "N" path back to the input of function block 484 for it to get the next fifty-one bits and build the next array. When all five arrays have been built, the program flows along the "Y" path to perform the interleave function.

In the interleave function, the program flows to a function block 494 to extract the MSB of each array. After the five MSB's associated with the five arrays are extracted, the program flows to function block 496 to shift the arrays to the left and then to function block 498 to determine if enough bits have been collected to comprise a byte. If so, the program flows to a function block 500 to transfer this byte to the bit stream processor. Although illustrated as occurring after the shift left operation of function block 496, it should be understood that whenever eight bits comprising a full byte are collected, they are shifted out, even prior to extracting all the MSB's and performing the shift left operation. After the bits in the array have been converted to bytes, which takes sixty-three passes, the program flows to an exit block 502 through a decision block 504.

Figure 27:
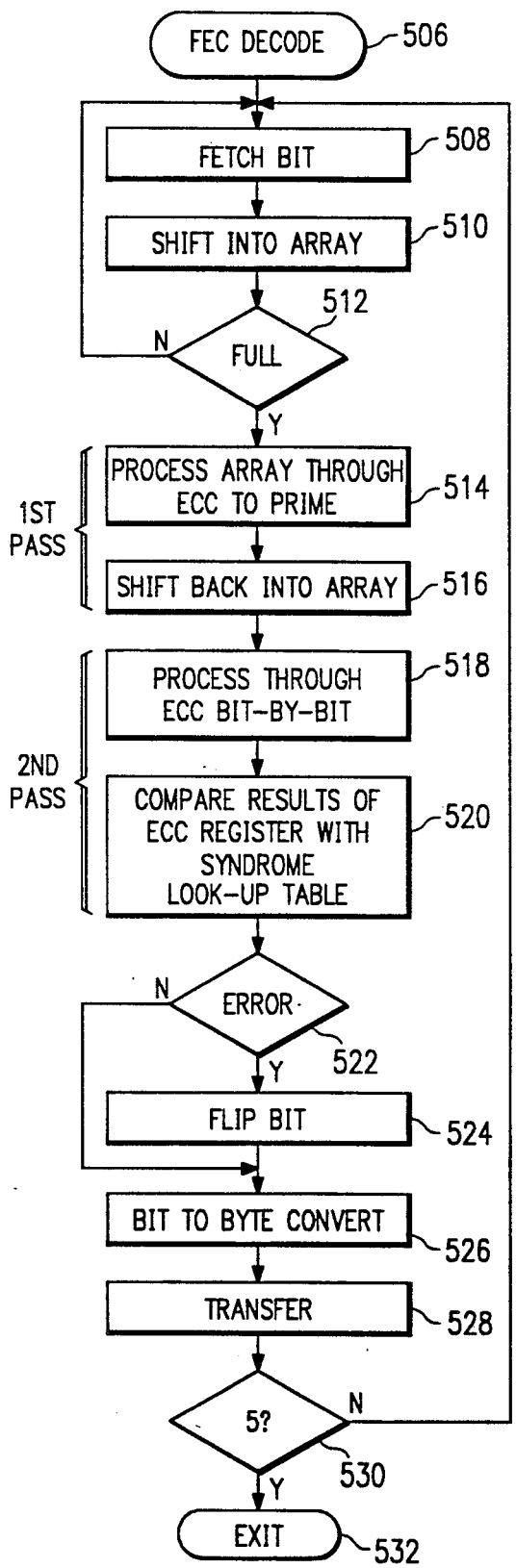

Referring now to FIG. 27, there is illustrated a flowchart depicting the decode operation of the FEC processor. The decode operation is essentially the opposite of the encode process in that the conversion must be made from columns to rows, the opposite of that for the encode operation. The bits are fed in a serial string and the first bit is fetched, as indicated by function block 508, and then each of the bits shifted into a respective one of the arrays, as indicated by function block 510. The program then flows to a decision block 512 to determine if a respective array is full. If not, the program flows along the "N" path back to the input of function block 508 until the array is full. When it is full, the program flows along the "Y" path to a function block 514 wherein each bit of the array is processed through the ECC routine in order to "prime" the array. As the bits are run through the ECC routine, they are shifted back into the array rather than shifting them out to the main CPU, as indicated by function block 516. After all the bits have been processed through for the first pass, the bits are then processed through the ECC on a bit-by-bit basis once again, as indicated by function block 518. During processing in the second pass, the results of the ECC routine processing are compared with a syndrome Lookup Table, as indicated by function block 520. If an error is detected, as indicated by a decision block 522, the program flows to a function block 524 to flip bits. If not, the program then flows to a function block 526 to perform a bit-to-byte conversion. If no error is detected, the program then flows to the function block 526. After conversion to bytes, the program flows to function block 528 to transfer the bytes out to the main CPU. The program then flows to a decision block 530 to determine if all five arrays of data have been processed to form the 315 bit FEC block. If not, the program flows back to the input of function block 508 until all five arrays of data have been processed. The program then flows to an exit block 532.

It can be seen with the encode and decode operation of FIGS. 26 and 27 that the FEC process is performed "on the fly". If the forward error correction is not required, the FEC processor would not pass the data through without encoding or decoding the data. Without the "on the fly" operation, the data transfer would not be real time.

In summary, there has been provided an interface for a generic non-secure Group 3 facsimile machine to communicate with a secure facsimile machine that operates in accordance with MIL-STD-188-161. The interface includes a main CPU for controlling the operation of the interface and bulk memory for storing pages of information. A bit stream processor communicates with the MIL-STD-188-161 protocol to receive and transfer data therebetween. An FEC processor is provided for performing forward error correction encoding and decoding. The non-secure Group 3 facsimile machine side of the interface has a facsimile processor for generating signals to communicate between the main CPU and the Group 3 facsimile machine through a telephone interface. In a receive operation, the main processor communicates with another secure facsimile machine through the secure telephone unit and transfers information via the memory to the Group 3 machine on a receive operation. In a send operation, the opposite occurs. The system is essentially "transparent" to what type of secure facsimile machine is disposed on the opposite end of the communication path, as long as it complies with MIL-STD-188-161.

Although the preferred embodiment has been described in detail, it should be understood that various changes, substitutions and alterations can be made therein without departing from the spirit and scope of the invention as defined by the appended claims.

What is claimed is:

1. A secure facsimile protocol converter for being disposed between the analog input/output port of a non-secure Group 3 facsimile machine having a first multi-page protocol and a digital input/output port having a second and single page protocol, comprising:
    a first input/output port for interfacing with the Group 3 facsimile machine;
    a second input/output port for interfacing with the digital input/output port;
    a facsimile processor unit for generating facsimile communication signals for communicating with the Group 3 machine in accordance with the associated first protocol;
    an digital port processor unit for communicating with the digital input/output port in accordance with the associated second protocol;
    a memory for storing transfer data; and
    a control processor unit for controlling said facsimile processor unit and said digital port processor unit to operate in either a send mode or in a receive mode, in the send mode, said control processor operable to receive pages of information from the Group 3 facsimile machine in accordance with the first multi-page protocol thereof for storage in said memory and subsequent transfer of said stored pages of information to the digital input/output port through said second input/output port in accordance with the second protocol and, in the receive mode, for receiving through said second input/output port pages of information from the secure encryptor/decryptor telephone unit in accordance with the second protocol for storage in said memory and subsequent transfer of said pages of data stored in said memory to said first input/output port in accordance with the first multi-page protocol thereof and subsequently to the Group 3 facsimile machine.

2. The facsimile protocol converter of claim 1, wherein said first input/output port comprises an RJ11 port.

3. The facsimile protocol converter of claim 2, wherein said second input/output port comprises an RS232 serial interface.

4. The facsimile protocol converter of claim 1, wherein said facsimile processor unit comprises:
    a processor for processing instructions to receive pages of transfer data from the Group 3 facsimile machine in accordance with the first protocol during the send mode for storage in said memory and transmit stored data from said memory to the Group 3 facsimile machine in accordance with the first protocol during the receive mode;
    a telephone interface for interfacing with the analog input/output port of the Group 3 facsimile machine; and
    a facsimile modem for interfacing between said processor and said telephone interface to allow transfer of data therebetween, said facsimile modem controlled by said processor.

5. The facsimile protocol converter of claim 1, wherein said digital port processor unit comprises:
    a processor for controlling the transfer of data to said memory during a receive operation and from said memory during a send operation;
    a digital interface for interfacing with the digital input/output port through said second input/output port;
    a forward error correction unit for selectively providing forward error correction on data transferred to and from the digital input/output port through said second input/output port in substantially real time in response to selection signals received from said control processor unit; and
    a bit stream processor for interfacing the processor unit with said digital interface in accordance with the second protocol.

6. The facsimile protocol converter of claim 1, wherein said control processor unit is operable to control transfer of data to said memory on a page basis, with transfer of data to and from the Group 3 facsimile machine occurring on a multi-page basis in accordance with the first protocol and transfer of data from and to the digital input/output port occurring on a single page basis in accordance with the second protocol.

7. The protocol converter of claim 1, and further comprising a non-volatile random access memory for storing setup instructions and means to input said setup instructions, said setup instructions accessible by said control processor unit.

8. The protocol converter of claim 7, wherein said digital port processor unit further includes:
    means for error correction in accordance with a forward error correction algorithm;
    said digital port processor unit operable to receive instructions from said control processor unit in accordance with instructions stored in said nonvolatile random access memory to select error correction or not select error correction, wherein selection of error correction will result in error correction on received data from the digital input/output port through said second input/output port, and will result in error encryption upon transmission of data to the digital input/output port through said second input/output port.

9. The protocol converter of claim 1 wherein the second protocol operates on a single page basis such that each page has a header defined therefore and the first multi-page protocol has a single header for each transmission of multi-pages wherein said control processor is further operable to remove the header from the data transmission received from the Group 3 facsimile machine prior to storage of data in said memory and to generate header information in accordance with the second protocol for each page of information transferred to the digital input/output port in accordance with the second protocol.

10. A secure facsimile protocol converter for being disposed between the telephone port of a Group 3 facsimile machine and a digital input/output port having a protocol that operates on a single page basis, comprising:

an RJ11 input/output port for interfacing with the Group 3 facsimile machine with a Group 3 facsimile protocol operating on a multi-page basis;

an RS232 serial input/output port for interfacing with the digital input/output port;

a telephone interface for generating signals to interface with the telephone port of the Group 3 facsimile machine through the RJ11 input/output port;

a facsimile modem for interfacing between a digital domain and the protocol of the Group 3 facsimile machine through said telephone interface;

a facsimile processor control unit for controlling the operation of said facsimile modem in the digital domain, and for transferring data thereto and therefrom;

an RS232 interface for interfacing with said RS232 serial input/output port;

a bit stream processor for interfacing with the protocol of the digital input/output port unit through said RS232 interface;

a forward error correction processor for selectively performing a forward error correction in substantially real time on received data from said bit stream processor and for encrypting error correction within data sent to said bit stream processor in substantially real time;

a main memory for storing transfer data on a page basis;

a main control processor unit for controlling the operation of said facsimile control processor unit and said forward error correction processor and said bit stream processor to operate in a send mode or a receive mode;

operation in the send mode operable to receive data from the Group 3 facsimile machine in accordance with the associated protocol operating on a multi-page basis for storage in said main memory on a page basis and subsequent transfer of the stored data to the digital input/output port on a single page basis in accordance with the protocol of the digital input/output port; and operation in the receive mode operable to receive data from the digital input/output port on a single page basis in accordance with the protocol of the digital input/output port for storage in said memory on a page basis and subsequent transfer to the Group 3 facsimile machine by said facsimile processor unit and said facsimile modem in accordance with the associated Group 3 protocol operating on a multi-page basis.

11. The facsimile protocol converter of claim 10, and further comprising a non-volatile dynamic random access memory and means for inputting data to said non-volatile random access memory from a point external to the protocol converter during a setup procedure, said non-volatile random access memory operable to store instructions for the operation of said main control processor unit.

12. The protocol converter of claim 10 wherein the protocol of the Group 3 facsimile machine requires a header with predetermined information to be associated with each multi-page transmission or reception and the second protocol requires predetermined information to be associated with each transmitted and received page of information and wherein said main control processor unit is operable in the send mode to remove the header from the transmission received from the telephone port of the Group 3 facsimile machine prior to storage of said data in the memory on a single page basis and said bit stream processor is operable in the send mode to insert a header in accordance with the second protocol for each page transmitted to the digital input/output port, said bit stream processor operable to remove the header from a transmission received from the digital input/output port and in conjunction with said main control processor unit to store the data in said main memory, and said facsimile processor operable during the receive operation to receive pages of information from said main memory under control of said main control processor unit and place a header on the transmission of multiple pages that defines the overall Group 3 transmission to the Group 3 facsimile machine.

13. The facsimile protocol converter of claim 11, wherein said forward error correction processor is operable to be disabled in accordance with select instructions stored in said non-volatile random access memory during setup procedure.

14. The facsimile protocol converter of claim 10, wherein said control processor unit is operable to receive speed instructions stored in said non-volatile random access memory that define the speed of operation of the Group 3 facsimile machine and the speed of operation of the digital input/output port, said control processor unit operable to buffer speed of data transfer therebetween in accordance with the instructions stored in said non-volatile random access memory.

15. A method for transmitting secure facsimile information between the telephone port of a non-secure Group 3 facsimile machine having a first protocol and a digital input/output port having a second protocol for communicating with a secure facsimile machine through a public telephone network, the first protocol operating on a multi-page basis and the second protocol operating on a single page basis, comprising the steps of:

providing a first input/output port for interfacing with the telephone port of the Group 3 facsimile machine;

providing a second input/output port for interfacing with the digital input/output port;

generating facsimile communication signals for communicating with the telephone port of the Group 3 facsimile machine in accordance with the first protocol through a facsimile processor unit;

communicating with the digital input/output port in accordance with the second protocol through a digital port processor unit;

storing transfer data in a memory storage device;

controlling in a main processor function the facsimile processor unit and the digital port processor unit to operate in either a send mode or in a receive mode;

in the send mode, receiving pages of information from the telephone port of the Group 3 facsimile machine through the first input/output port in accordance with the first protocol for storage in the memory device and subsequently transferring the stored pages of information to the digital input/output port through the second input/output port in accordance with the second protocol; and in the receive mode, receiving through the second input/output port pages of information from the digital input/output port in accordance with the second protocol for storage in the memory device and subsequently transferring the pages of data stored in the memory device to the first input/output port and subsequently to the telephone port of the Group 3 facsimile machine in accordance with the first protocol.

16. The method of claim 15, wherein the step of providing the first input/output port comprises providing an RJ11 port.

17. The method of claim 16, wherein the step of providing the second input/output port comprises providing an RS232 serial interface.

18. The method of claim 15, wherein the step of generating the facsimile communication signals in the facsimile processor unit comprises:

providing a facsimile processor;

processing instructions in the facsimile processor to receive pages of transferred data from the telephone port of the Group 3 facsimile machine during the send mode in accordance with the first protocol for storage in the memory device, and transmitting stored data from the memory device to the Group 3 facsimile machine during the receive mode in accordance with the first protocol;

interfacing through a telephone interface with the telephone port of the Group 3 facsimile machine; and interfacing between the facsimile processor and the telephone interface via a facsimile modem to allow transfer of data therebetween, and controlling the facsimile modem with the facsimile processor.

19. The method of claim 15, wherein the step of communicating with the digital input/output port with the digital port processor unit comprises:

providing a digital processor;

utilizing the digital processor to control the transfer of data to the memory during a receive operation in accordance with the second protocol, and from the memory during a send operation in accordance with the second protocol;

interfacing through a digital interface and the second input/output port with the digital input/output port;

selectively providing forward error correction on data transferred to and from the digital input/output port with a forward error correction unit in response to an internally generated selection;

providing a bit stream processor; and interfacing the digital processor through the bit stream processor with the digital interface in accordance with the second protocol.

20. The method of claim 15, wherein the step of controlling the transfer of data to and from the memory device operates on a single page basis, with the transfer of data to and from the Group 3 facsimile machine controlled to occur on a multi-page basis in accordance with the first protocol and transfer of data from the digital input/output port is controlled to occur on a single page basis in accordance with the second protocol.

21. The method of claim 15 and further comprise the steps of:

providing a non-volatile random access memory;

storing setup instructions in the non-volatile random access memory; and inputting the setup instructions into the non-volatile random access memory, the non-volatile random access memory accessible by the control operations in the main processor function.

22. The method of claim 21, wherein the step of communicating with the digital input/output port by the digital port processor unit further comprises:

providing a forward error correction device for correcting errors on incoming data in accordance with a forward error correction algorithm and encoding forward error correction information in outgoing data; and receiving instructions corresponding to instructions stored in the non-volatile random access memory unit to select error correction or not select error correction, wherein selection of error correction will result in forward error correction on received data from the digital input/output port, and will result in encoding data for forward error correction upon transmission of data to the digital input/output port.

23. A secure facsimile protocol converter for being disposed between the telephone port of a Group 3 facsimile machine and a digital input/output port, the Group 3 facsimile machine operating in accordance with a Group 3 facsimile protocol requiring a single first protocol header associated with a multi-page transmission or reception and the input/output of data to the digital input/output port operating in accordance with a second protocol requiring a single second protocol header for each page of information transmitted thereto or received therefrom, comprising:

a first input/output port for interfacing with the telephone input/output port of the Group 3 facsimile machine;

a second input/output port for interfacing with the digital input/output port;

a first converter device for operating in a transmission mode to receive the multi-page transmission from the Group 3 facsimile machine through said first input/output port and remove the first protocol header therefrom followed by generation of a second protocol header in accordance with the second protocol for association with each page of information, said first converter device operable to transmit the single pages and associated second protocol headers out through said second input/output port; and a second converter device operating in a receive mode for receiving pages of information from said second input/output port each having a second protocol header associated therewith in accordance with the second protocol, said second converter device operable to remove said second protocol header from each of said pages of information received from said second input/output port and generate a single first protocol header for a multipage transmission to the Group 3 facsimile machine through said first input/output port in accordance with the Group 3 facsimile protocol, and then transmit said multi-page transmission to the Group 3 facsimile machine through said first input/output port.

24. The secure facsimile protocol converter of claim 23 and further comprising a memory for storing pages of information received from the telephone port of the Group 3 facsimile machine after said first protocol header has been removed and prior to generation of the second protocol header, said memory operable to store pages of information received from said second input/output port after said second protocol header has been removed and prior to assembling said first protocol header on the initial page of information associated with the multi-page transmission that is to be transmitted to said first input/output port.

* * * * *